US011613242B2

(12) United States Patent
Miyaoka

(10) Patent No.: US 11,613,242 B2
(45) Date of Patent: Mar. 28, 2023

(54) CONTROL DEVICE AND CONTROL METHOD FOR A VEHICLE, AND STORAGE MEDIUM

(71) Applicant: Honda Motor Co., Ltd., Tokyo (JP)

(72) Inventor: Fumishige Miyaoka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 260 days.

(21) Appl. No.: 17/218,182

(22) Filed: Mar. 31, 2021

(65) Prior Publication Data

US 2021/0300378 A1 Sep. 30, 2021

(30) Foreign Application Priority Data

Mar. 31, 2020 (JP) .............................. JP2020-063745

(51) Int. Cl.
| | |
|---|---|
| *B60W 10/06* | (2006.01) |
| *B60W 10/115* | (2012.01) |
| *B60W 30/18* | (2012.01) |
| *B60W 10/10* | (2012.01) |
| *B60W 60/00* | (2020.01) |

(Continued)

(52) U.S. Cl.
CPC .......... *B60W 10/115* (2013.01); *B60W 10/06* (2013.01); *B60W 10/10* (2013.01); *B60W 30/18163* (2013.01); *B60W 60/001* (2020.02); *B60W 60/0016* (2020.02); *B60W 30/20* (2013.01); *B60W 40/105* (2013.01); *B60W 60/0015* (2020.02); *B60W 2510/0661* (2013.01); *B60W 2710/0644* (2013.01); *B60W 2710/0666* (2013.01); *B60W 2710/1005* (2013.01); *B60W 2710/1044* (2013.01); *B60W 2720/10* (2013.01)

(58) Field of Classification Search
CPC ................. B60W 10/06; B60W 10/10; B60W 30/18163; B60W 60/01; B60W 60/0016; B60W 60/0015; B60W 2710/0644; B60W 2710/0666; B60W 2710/1005; B60W 2710/1044; B60W 2720/10
USPC .......................................................... 701/54
See application file for complete search history.

(56) References Cited

U.S. PATENT DOCUMENTS

| | | | |
|---|---|---|---|
| 2019/0031196 A1* | 1/2019 | Kim ...................... | B60W 30/16 |
| 2019/0202458 A1* | 7/2019 | Konishi .............. | B60W 30/162 |
| 2021/0300421 A1* | 9/2021 | Miyaoka ........... | B60W 60/0015 |

FOREIGN PATENT DOCUMENTS

| | | |
|---|---|---|
| JP | 2019119303 | 7/2019 |
| JP | 2020011546 A * | 1/2020 |

* cited by examiner

*Primary Examiner* — Roger L Pang
(74) *Attorney, Agent, or Firm* — JCIPRNET

(57) ABSTRACT

Provided are a control device and a control method for a vehicle, and storage medium which are capable of reducing vibration, noise, and speed change shock caused by a downshift when an increase in a required driving force is predicted during automated drive. In a control device (100) for a vehicle which is equipped with an automatic transmission (TM) and capable of automated driving control, when an increase in a required driving force is predicted during the execution of the automated driving control, a vehicle speed of the vehicle is maintained or decelerated until an increase timing of the required driving force, an engine rotation number is increased within a standby period until the increase timing of the required driving force, a torque of the engine is decreased in response to the increase in the engine rotation number, and a shift gear level of the automatic transmission is shifted downward.

11 Claims, 13 Drawing Sheets

(51) Int. Cl.
*B60W 30/20* (2006.01)
*B60W 40/105* (2012.01)

CONTROL DEVICE AND CONTROL METHOD FOR A VEHICLE, AND STORAGE MEDIUM

CROSS-REFERENCE TO RELATED APPLICATION

This application claims the priority benefits of Japanese application no. 2020-063745, filed on Mar. 31, 2020. The entirety of the above-mentioned patent application is hereby incorporated by reference herein and made a part of this specification.

BACKGROUND

Technical Field

The disclosure relates to a vehicle equipped with an automatic transmission (hereinafter, referred to as an automatic speed change vehicle), and particularly relates to a control technique for an automatic speed change vehicle in automated drive.

Related Art

A vehicle capable of automated drive can calculate the next action in advance and execute the next action by recognizing a traveling state and a surrounding situation of the vehicle. For example, when an automated drive vehicle performs overtaking traveling, it is determined whether or not to execute overtaking according to the surrounding situation, and when overtaking is executed, a control necessary for overtaking is executed by acceleration calculation or the like.

According to a traveling control device disclosed in patent literature 1 (Japanese Patent Laid-Open No. 2019-119303), when the automated drive vehicle performs overtaking traveling, it is determined whether or not to execute overtaking according to the traveling state of a rear vehicle, and a degree of acceleration traveling required when the rear vehicle is approaching is calculated in advance to perform appropriate traveling control.

The automatic speed change vehicle may need to downshift when a required driving force is increased, when there is a downhill, or the like during automated drive. When acceleration for overtaking is required as described above, a downshift can be executed because a large driving torque is required. In addition, the downshift may also be executed to keep the vehicle speed constant on the downhill. However, if this speed change is performed in a short time, the driving torque rapidly increases, that is, speed change shock becomes large. There is a possibility that this speed change shock may give an occupant a sense of discomfort and may lead to deterioration of riding comfort. In addition, the engine rotation number may also change significantly due to the downshift, and a large change in the sound may also give the occupant a sense of discomfort.

In general, the occupant does not drive the vehicle by himself in automated driving control, and thus the occupant is more sensitive to the sense of discomfort such as vehicle vibration, noise, speed change shock, or the like caused by the operation of an engine or transmission during acceleration/deceleration. Thus, especially during automated drive, a vibration/noise reduction performance (NV reduction performance) and a speed change shock reduction measure higher than those during manual driving are required.

An objective of the disclosure is to provide a control device for a vehicle and a control method for a vehicle which are capable of reducing vibration, noise, and speed change shock caused by a downshift when an increase in the required driving force is predicted during automated drive.

SUMMARY

According to a first aspect of the disclosure, in a control device (100) for a vehicle (1) which is equipped with an automatic transmission and capable of automated driving control for automatically controlling at least acceleration/deceleration of the vehicle (1), when an increase in the required driving force is predicted during the execution of the automated driving control, a vehicle speed of the vehicle (1) is maintained or decelerated until an increase timing of the required driving force; an engine rotation number is increased within a standby period until the increase timing of the required driving force; and a torque of the engine is decreased in response to the increase in the engine rotation number, and a shift gear level of the automatic transmission is shifted downward.

According to a second aspect of the disclosure, in a control method for a vehicle (1) which is equipped with an automatic transmission and capable of automated driving control for automatically controlling at least acceleration/deceleration of the vehicle (1), when an increase in the required driving force is predicted during the execution of the automated driving control, a vehicle speed of the vehicle (1) is maintained or decelerated until an increase timing of the required driving force; an engine rotation number is increased within a standby period until the increase timing of the required driving force; and a torque of the engine is decreased in response to the increase in the engine rotation number, and a shift gear level of the automatic transmission is shifted downward.

According to a third aspect of the disclosure, a storage medium storing a program, which causes a processor to function as a control device (100) for a vehicle (1) which is equipped with an automatic transmission and capable of automated driving control for automatically controlling at least acceleration/deceleration of the vehicle (1), realizes the following functions by the processor: when an increase in the required driving force is predicted during the execution of the automated driving control, a vehicle speed of the vehicle (1) is maintained or decelerated until an increase timing of the required driving force; an engine rotation number is increased within a standby period until the increase timing of the required driving force; and a torque of the engine is decreased in response to the increase in the engine rotation number, and a shift gear level of the automatic transmission is shifted downward.

DESCRIPTION OF THE EMBODIMENTS

Figure 1:
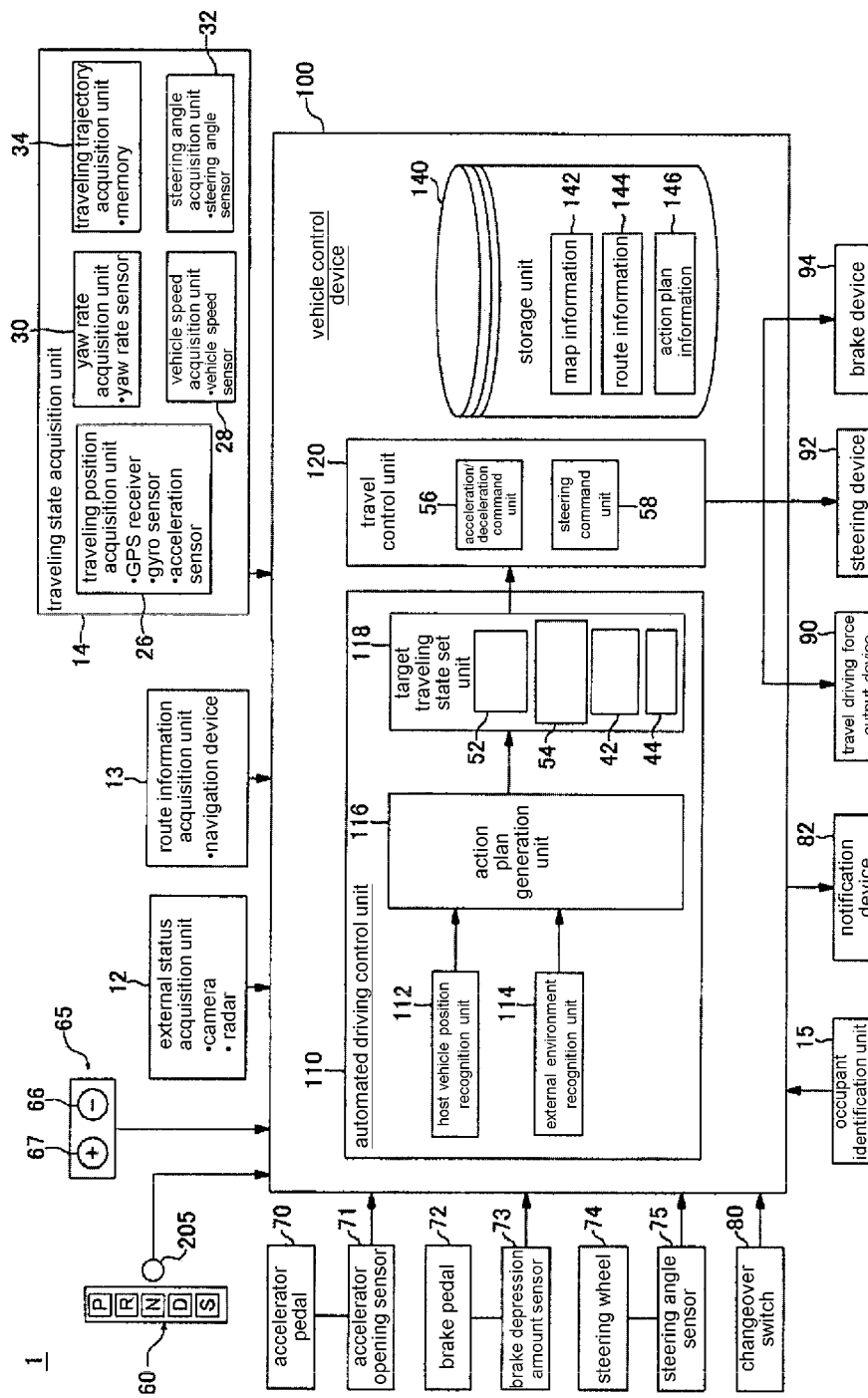
FIG. 1 is a function configuration diagram relating to an automated driving control in a vehicle control device according to an embodiment of the disclosure.

Thereby, because the engine rotation number is increased, the engine torque is decreased, and the shift gear level is downshifted during the standby period, a sense of discomfort caused by a sudden increase in the engine rotation number and a speed change shock when the driving force is actually increased can be significantly alleviated. The increase in the engine rotation number is desirably executed in a period shorter than the standby period and longer than a normal speed change time. Accordingly, the engine rotation number is increased slowly during the standby of overtaking control, which makes it difficult for an occupant to notice.

When the increase in the required driving force is suspended, the shift gear level of the automatic transmission is shifted upward to reduce the engine rotation number that has been increased up to that time. At this time, the upward shift of the shift gear level of the automatic transmission is desirably performed in a manner that an amount of change of the decrease in the engine rotation number is smaller than that of the increase. If the increase in the required driving force is suspended, the engine rotation number gradually decreases, and the amount of change in the decrease is smaller than that in the increase, which makes it difficult for the occupant to notice.

The increase in the required driving force is necessary at the time of overtaking, and if there is a possibility of collision with a vehicle in front or behind in the overtaking lane when the overtaking is executed, the overtaking control is desirably waited for until the overtaking becomes possible. Thereby, because the engine rotation number is increased, the engine torque is decreased, and the shift gear level is downshifted during the standby period, a sense of discomfort caused by a sudden increase in the engine rotation number and a speed change shock when the overtaking is actually performed can be significantly alleviated.

As described above, according to the disclosure, when an increase in the required driving force is predicted during automated drive, vibration, noise and speed change shock caused by a downshift can be reduced.

1. Outline of Embodiment

In a vehicle equipped with an automatic transmission, when there is time until a driving force is required during automated drive, a driving force and a vehicle speed are maintained constant within a predetermined period until increase timing of the required driving force, the engine rotation number is increased, an engine torque is decreased in response to the increase in the rotation number, and a shift gear level is downshifted. Thereby, a sense of discomfort caused by sudden increase in the engine rotation number and speed change shock when the driving force is actually increased can be significantly alleviated.

Hereinafter, an automated driving control which is a premise of the disclosure and an example of an automatic speed change vehicle are described with reference to FIG. 1 and FIG. 2, and subsequently, an embodiment of the disclosure is described in detail.

2. Automated Driving Control

As illustrated in FIG. 1, a vehicle 1 is an automobile of two wheels, three wheels, four wheels, or the like, and is a vehicle equipped with an automatic transmission as described later in the embodiment. The automated driving control may be applied to an automobile powered by a diesel engine, a gasoline engine, or the like, or may be applied to an electric automobile that drives a motor by using electric power obtained from a secondary battery, a hydrogen fuel cell, a metal fuel cell, an alcohol fuel cell, or the like.

<Device Configuration of Vehicle>

The vehicle 1 is equipped with the following devices and machine groups in addition to a vehicle control device 100 that performs a vehicle control including the automated driving control.

Parts for taking in a variety of information from the outside of the vehicle 1 (an external situation acquisition unit 12, a route information acquisition unit 13, a traveling state acquisition unit 14, and the like are included, in addition, buttons, dial switches, graphical user interface (GUI) switches, and the like may be included);

Operation devices (an accelerator pedal 70, a brake pedal 72, a steering wheel 74, a changeover switch 80, and the like);

Operation detection sensors (an accelerator opening sensor 71 that detects accelerator opening of the accelerator pedal 70, a brake depression amount sensor (brake switch) 73 that detects a depression amount of the brake pedal 72, a steering angle sensor (or a steering torque sensor) 75 that detects the steering angle of the steering wheel 74); Notification device (output unit) 82;

Devices for driving or steering the vehicle 1 (a travel driving force output device (driving device) 90, a steering device 92, and a brake device 94); and Communication lines and networks (controller are a network (CAN), wireless communication networks, and the like) that connect these devices and machines.

The external situation acquisition unit 12 is configured to acquire the external situation of the vehicle 1, for example, environmental information around the vehicle such as a lane of a travel path and an object around the vehicle, and includes for example, various cameras (monocular camera, stereo camera, infrared camera, and the like), various radars (millimeter wave radar, microwave radar, laser radar, and the like), and the like. In addition, a fusion sensor can also be used that integrates information obtained by the camera and information obtained by the radar.

The route information acquisition unit 13 includes a navigation device. The navigation device has a global navigation satellite system (GNSS) receiver, map information (navigation map), a touch panel display device that functions as a user interface, a speaker, a microphone, and the like. The navigation device identifies the position of the vehicle 1 by the GNSS receiver and derives a route from the position to a destination specified by a user. The route derived by the navigation device is stored in a storage unit 140 as route information 144. The position of the vehicle 1 may be identified or complemented by an inertial navigation system (INS) using the output of the traveling state acquisition unit 14. In addition, the navigation device provides guidance by voice and navigation display on the route to the destination when the vehicle control device 100 is executing manual driving control. Moreover, a configuration for identifying the position of the vehicle 1 may be arranged independently of the navigation device. In addition, the navigation device may be realized by, for example, one function of a terminal device such as a smartphone, a tablet terminal, or the like owned by the user. In this case, information is transmitted and received between the terminal device and the vehicle control device 100 by wireless or wired communication.

The traveling state acquisition unit 14 is configured to acquire a current traveling state of the vehicle 1. The traveling state acquisition unit 14 includes a traveling position acquisition unit 26, a vehicle speed acquisition unit 28, a yaw rate acquisition unit 30, a steering angle acquisition unit 32, and a traveling trajectory acquisition unit 34.

The traveling position acquisition unit 26 is configured to acquire the traveling position of the vehicle 1 which is one of the traveling states and a posture (traveling direction) of the vehicle 1. The traveling position acquisition unit 26 includes various positioning devices such as a device (GPS receiver, GNSS receiver, beacon receiver, or the like) that receives electromagnetic waves transmitted from a satellite or a road device to acquire position information (latitude, longitude, altitude, coordinates, and the like), a gyro sensor, an acceleration sensor, and the like. The traveling position of the vehicle 1 is measured with reference to a specific portion of the vehicle 1.

The vehicle speed acquisition unit 28 is configured to acquire the speed of the vehicle 1 (hereinafter, referred to as vehicle speed) which is one of the traveling states. The vehicle speed acquisition unit 28 includes, for example, speed sensors arranged on one or more wheels.

The yaw rate acquisition unit 30 is configured to acquire the yaw rate of the vehicle 1 which is one of the traveling states. The yaw rate acquisition unit 30 includes, for example, a yaw rate sensor, and the like.

The steering angle acquisition unit 32 is configured to acquire the steering angle which is one of the traveling states. The steering angle acquisition unit 32 includes, for example, a steering angle sensor arranged on a steering shaft, and the like. Here, a steering angular speed and a steering angular acceleration are also acquired based on the acquired steering angle.

The traveling trajectory acquisition unit 34 is configured to acquire information (actual traveling trajectory) of an actual traveling trajectory of the vehicle 1 which is one of the traveling states. The actual traveling trajectory includes a trajectory (track) on which the vehicle 1 has actually traveled, and may include a trajectory predetermined to be traveled from now on, for example, an extension line on the front side of the traveled trajectory (track) in the traveling direction. The traveling trajectory acquisition unit 34 includes a memory. The memory stores the position information of a series of points and sequences included in the actual traveling trajectory. In addition, the extension line can be predicted by a computer or the like.

The accelerator opening sensor 71, the brake depression amount sensor 73 and the steering angle sensor 75, which are operation detection sensors, respectively output the accelerator opening, the brake depression amount, and the steering angle as detection results to the vehicle control device 100.

The changeover switch 80 is a switch operated by an occupant of the vehicle 1. The changeover switch 80 can receive an operation of the occupant and switch driving modes (for example, an automated driving control and a manual driving control) according to received operation contents. The changeover switch 80 generates a driving mode specification signal for specifying the driving mode of the vehicle 1 from the operation contents of the occupant, and outputs the driving mode specification signal to the vehicle control device 100.

In addition, the vehicle 1 includes a shift device 60 operated by a driver via a shift lever. As shown in FIG. 1, positions of the shift lever (not shown) in the shift device 60 are, for example, P (parking), R (reverse traveling), N (neutral), D (forward traveling in an automatic speed change mode (normal mode)), and S (forward traveling in a sport mode). A shift position sensor 205 is arranged in the vicinity of the shift device 60. The shift position sensor 205 detects the position of the shift lever operated by the driver. The vehicle control device 100 inputs shift position information detected by the shift position sensor 205.

In addition, the vehicle 1 of the embodiment includes a puddle switch 65 arranged in the vicinity of the steering wheel 74. The puddle switch 65 has a −switch (minus button) 66 for instructing a downshift in a manual speed change mode (manual mode) during manual driving (manual driving mode), and a +switch (plus button) 67 for instructing a shift-up in the manual speed change mode. In the manual speed change mode of an automatic transmission TM in the manual driving mode, operation signals of the minus button 66 and the plus button 67 are output to the electronic control unit (vehicle control device) 100, and upshift or downshift of the shift gear level set by the automatic transmission TM is performed according to the traveling state of the vehicle 1. Moreover, in the embodiment, during manual driving, for example, when the position of the shift lever is in the D range or the S range and the automatic speed change mode is set, if either of the paddle switches 66 and 67 is operated by the driver, the automatic speed change mode is switched to the manual speed change mode (manual mode). In addition, during automated drive, the operation of the puddle switch 65 is provided with a function (a function different from that during manual driving) described in detail below.

The notification device 82 is a device or a group of machines capable of outputting a variety of information. For example, the notification device 82 outputs information for urging the occupant of the vehicle 1 to shift from the automated driving control to the manual driving control. As the notification device 82, for example, at least one of a speaker, a vibrator, a display device, a light emitting device, and the like is used.

An occupant identification unit 15 includes, for example, an in-vehicle camera capable of capturing an image of the interior of the vehicle 1. The in-vehicle camera may be, for example, a digital camera using a solid-state imaging element such as CCD, CMOS, or the like; a near-infrared camera combined with a near-infrared light source; or the like. The vehicle control device 100 can acquire images taken by the occupant identification unit 15 (in-vehicle camera), and identify a current driver of the vehicle 1 from an image of a face of the driver of the vehicle 1 included in the images.

Figure 2:
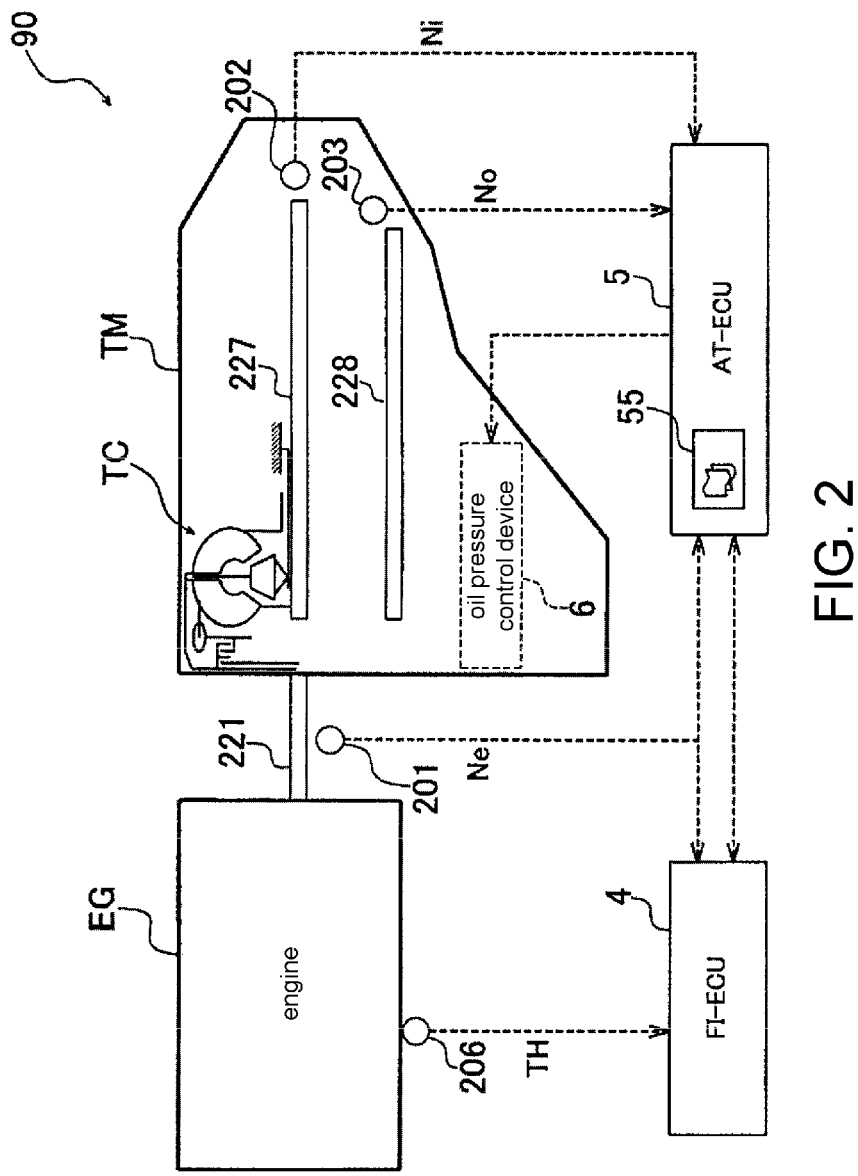
FIG. 2 is a block diagram schematically showing an example of an internal configuration of an automatic speed change vehicle (multilevel speed change vehicle) which uses a control device according to a first example of the disclosure.

As illustrated in FIG. 2, the travel driving force output device (driving device) 90 includes an internal combustion engine (engine) EG which is a driving source, and the automatic transmission TM connected to the engine EG via a torque converter TC having a lockup clutch, and the travel driving force output device further includes an electronic control unit (FI-ECU) 4 that controls the engine EG and an AT-ECU 5 that controls the automatic transmission TM. When the travel driving force output device 90 includes the engine EG and the automatic transmission TM, according to information input from a traveling control unit 120 described later shown in FIG. 1, the FI-ECU 4 and the AT-ECU 5 control a throttle opening of the engine EG, a shift level of the automatic transmission TM, and the like in cooperation with each other, and control the traveling driving force (torque) for the vehicle 1 to travel.

The steering device 92 includes, for example, an electric motor. For example, the electric motor, applies a force to a rack and pinion mechanism to change a direction of a turning wheel. The steering device 92 drives the electric motor and changes the direction of the turning wheel according to the information input from the traveling control unit 120.

The brake device 94 is, for example, an electric servo brake device that includes a brake caliper, a cylinder that transmits an oil pressure to the brake caliper, an electric motor that generates the oil pressure in the cylinder, and a braking control unit that controls the cylinder and the electric motor to control braking of the brake caliper. The electric servo brake device is a braking force output device, and the braking control unit controls the electric motor according to the information input from the traveling control unit 120, and controls the electric motor in a manner that a brake torque which outputs a braking force corresponding to a braking operation is output to each wheel. The electric servo brake device may include, as a backup, a mechanism for transmitting the oil pressure generated by the operation of the brake pedal 72 to the cylinder via a master cylinder. Moreover, the brake device 94 is not limited to the electric servo brake device described above and may be an electronically controlled oil pressure brake device. The electronically controlled oil pressure brake device controls an actuator according to the information input from the traveling control unit 120 to transmit the oil pressure of the master cylinder to the cylinder.

<Control Device>

Next, the vehicle control device 100 is described. The vehicle control device 100 includes an automated driving control unit 110, the traveling control unit 120, and the storage unit 140. Each part of the automated driving control unit 110 and a part or all of the traveling control unit 120 are realized by executing a program by a processor such as a central processing unit (CPU) or the like. In addition, a part or all of the automated driving control unit 110 and the traveling control unit 120 may be realized by a hardware such as a large scale integration (LSI), an application specific integrated circuit (ASIC), or the like. In addition, the storage unit 140 is realized by a read only memory (ROM), a random access memory (RAM), a hard disk drive (HDD), a flash memory, or the like. The program executed by the processor may be stored in the storage unit 140 in advance, or may be downloaded from an external device via an in-vehicle Internet facility or the like. In addition, the program may be installed in the storage unit 140 in a manner that a portable storage medium in which the program is stored is mounted on a drive device. In addition, the vehicle control device 100 may be decentralized by a plurality of computer devices. Thereby, with respect to the in-vehicle computer of the vehicle 1, the above-described hardware function unit and the software including the program and the like can cooperate with each other to realize various processes in the embodiment.

The storage unit 140 stores map information 142, the route information 144, and action plan information 146.

The map information 142 is, for example, map information with higher precision than the navigation map of the route information acquisition unit 13, and includes information on the center of a lane, information on the boundary of a lane, or the like. More specifically, the map information 142 includes road information, traffic regulation information, address information (address/zip code), facility information, telephone number information, and the like. The road information includes: information indicating a type of a road such as express highway, toll road, national road, or prefectural road; and information such as the number of lanes on the road, a width of each lane, a slope of the road, a position (3D coordinates including longitudinal, latitude, and height) of the road, a curvature of lane curves, positions of a merging point and a branching point of the lanes, signs on the road, and the like. The traffic regulation information includes information that lanes are blocked due to construction work, traffic accidents, traffic jams, or the like.

The route information 144 is an element stored in the storage unit 140, identifies, for example, the position of the vehicle 1 by the GNSS receiver configuring the navigation device of the route information acquisition unit 13, and is a route derived from the position to a destination specified by a user.

The action plan information 146 is an element stored in the storage unit 140, and is information showing an action plan generated by an action plan generation unit 116 of the automated driving control unit 110 based on the map information acquired by the route information acquisition unit 13.

The automated driving control unit 110 includes a host vehicle position recognition unit 112, an external environment recognition unit 114, the action plan generation unit 116, and a target traveling state set unit 118.

The automated driving control unit 110 switches the driving mode and performs control according to the input of the signal from the changeover switch 80. The driving mode includes an automated driving mode (automated driving control) in which the acceleration/deceleration and the steering of the vehicle 1 are automatically controlled, and the manual driving mode (manual driving control) in which the acceleration/deceleration of the vehicle 1 is controlled based on manual operations on the operation device such as the accelerator pedal 70, the brake pedal 72, or the like, and the steering is controlled based on manual operations on the operation device such as the steering wheel 74 or the like, but the driving mode is not limited hereto. Another driving mode may include, for example, a semi-automated driving mode (semi-automated driving control) in which one of the acceleration/deceleration and the steering of the vehicle 1 is automatically controlled, and the other is controlled based on manual operations on the operation device.

Based on the map information 142 stored in the storage unit 140 and information input from the external situation acquisition unit 12, the route information acquisition unit 13, or the traveling state acquisition unit 14, the host vehicle position recognition unit 112 recognizes the lane (traveling lane) in which the vehicle 1 is traveling and the relative position of the vehicle 1 with respect to the traveling lane. The host vehicle position recognition unit 112 recognizes, for example, a deviation of a reference point (for example, the center of gravity) of the vehicle 1 from the center of the traveling lane, and an angle formed with respect to a line obtained by connecting the center of the traveling lane in the traveling direction of the vehicle 1, as the relative position of the vehicle 1 with respect to the traveling lane. Moreover, instead of this, the host vehicle position recognition unit 112 may recognize the position of the reference point of the vehicle 1 with respect to any side end of a travel lane and the like as the relative position of the vehicle 1 with respect to the traveling lane.

The external environment recognition unit 114 recognizes the position, speed, acceleration, and other states of surrounding vehicles based on the information input from the external situation acquisition unit 12 and the like. The surrounding vehicles in the embodiment refer to other vehicles traveling around the vehicle 1, and vehicles traveling in the same direction as the vehicle 1. Moreover, in particular, the surrounding vehicles in the embodiment refer to a front vehicle that the vehicle 1 will overtake and a rear vehicle which will overtake the vehicle 1. The position of the surrounding vehicle may be represented by a representative point such as the center of gravity of the vehicle 1, a corner, or the like, or may be represented by an area expressed by the outline of the vehicle 1. The "state" of the surrounding vehicle may include whether or not the acceleration and a lane change of the surrounding vehicle are made (or whether or not the lane change will be made) based on the information of the above various machines. In addition, the external environment recognition unit 114 may recognize, in addition to the surrounding vehicle, the positions of other objects such as a guard rail, a telephone pole, a parked vehicle, and a pedestrian.

The action plan generation unit 116 sets a start point of the automated drive, a planned end point of the automated drive, and/or a destination of the automated drive. The start point of the automated drive may be a current position of the vehicle 1, or a point where the occupant of the vehicle 1 has instructed the automated drive.

The action plan generated by the action plan generation unit 116 is configured by, for example, a plurality of events that that are sequentially executed at each predetermined point on a road to be traveled on next time. The events include, for example: a deceleration event for decelerating the vehicle 1; an acceleration event for accelerating the vehicle 1; a lane keeping event for causing the vehicle 1 to travel in a manner of not deviating from the traveling lane; a lane changing event for changing the traveling lane; an overtaking event that causes the vehicle 1 to overtake a preceding vehicle; a branching event that changes the vehicle to a desired lane at a branching point or causes the vehicle 1 to travel in a manner of not deviating from a current lane; a merging event that accelerates or decelerates the vehicle 1 in a merging lane to be merged with a main lane and changes the traveling lane; and the like.

The target traveling state set unit 118 is configured to set a target traveling state, which is a traveling state targeted by the vehicle 1, based on the action plan determined by the action plan generation unit 116, and the variety of information acquired by the external situation acquisition unit 12, the route information acquisition unit 13, and the traveling state acquisition unit 14. The target traveling state set unit 118 includes a target value set unit 52, a target trajectory set unit 54, a deviation acquisition unit 42, and a correction unit 44.

The target value set unit 52 is configured to set information of a traveling position (latitude, longitude, altitude, coordinates, and the like) targeted by the vehicle 1 (also simply referred to as s target position), target value information of the vehicle speed (also simply referred to as target vehicle speed), and target value information of the yaw rate (also simply referred to as target yaw rate).

The target trajectory set unit 54 is configured to set information of a target trajectory of the vehicle 1 (also simply referred to as a target trajectory) based on the external situation acquired by the external situation acquisition unit 12 and the traveling route information acquired by the route information acquisition unit 13. The target trajectory includes information of the target position per unit time. Posture information (traveling direction) of the vehicle 1 is associated with each target position. In addition, the target value information such as the vehicle speed, the acceleration, yaw rate, the lateral G, the steering angle, the steering angular speed, the steering angular acceleration, and the like may be associated with each target position. The above-described target position, target vehicle speed, target yaw rate, and target trajectory are information indicating the target traveling state.

The deviation acquisition unit 42 is configured to acquire a deviation of an actual traveling state with respect to the target traveling state based on the target traveling state set by the target value set unit 52 and the target trajectory set unit 54 of the target traveling state set unit 118 and the actual traveling state acquired by the traveling state acquisition unit 14.

The correction unit 44 is configured to correct the target traveling state according to the deviation acquired by the deviation acquisition unit 42. Specifically, as the deviation becomes larger, the correction unit 44 causes the target traveling state set by the target traveling state set unit 118 to approach the actual traveling state acquired by the traveling state acquisition unit 14, and sets a new target traveling state.

The traveling control unit 120 includes an acceleration/deceleration command unit 56 and a steering command unit 58, and is configured to control the traveling of the vehicle 1. Specifically, the traveling control unit 120 outputs a command value of traveling control to the travel driving force output device 90, the steering device 92, and the brake device 94 described above so as to cause the actual traveling state of the vehicle 1 to match or approach the target traveling state set by the target traveling state set unit 118, or the new target traveling state set by the correction unit 44.

The acceleration/deceleration command unit 56 is configured to perform acceleration/deceleration control among the traveling control of the vehicle 1. Specifically, based on the target traveling state (target acceleration/deceleration) set by the target traveling state set unit 118 or the correction unit 44 and the actual traveling state (actual acceleration/deceleration), the acceleration/deceleration command unit 56 calculates an acceleration/deceleration command value for matching the traveling state of the vehicle 1 with the target traveling state.

The steering command unit 58 is configured to perform a steering control of the traveling control of the vehicle 1. Specifically, based on the target traveling state set by the target traveling state set unit 118 or the correction unit 44 and the actual traveling state, the steering command unit 58 calculates a steering angular speed command value for matching the actual traveling state of the vehicle 1 with the target traveling state.

3. First Example (Driving System Having Automatic Transmission)

In FIG. 2, the configuration of the travel driving force output device (driving device) 90 of the vehicle 1 is schematically shown. Rotation of the engine EG is output to a crank shaft (an output shaft of the engine EG) 221 and transmitted to an input shaft 227 of the automatic transmission TM via the torque converter TC. The automatic transmission TM changes a speed of the rotation transmitted from the engine EG to the input shaft 227 and outputs the rotation from an output shaft 228 to a driving wheel side. The automatic transmission TM is a stepped automatic transmission capable of setting a plurality of shift gear levels for forward traveling and one shift gear level for reverse traveling.

In addition, the travel driving force output device 90 includes a fuel injection control device (FI-ECU) 4 that electronically controls the engine EG, an automatic transmission control device (AT-ECU) 5 that electronically controls the automatic transmission TM including the torque converter TC, and an oil pressure control device 6 that hydraulically controls the rotation driving and lockup control of the torque converter TC and the fastening (engagement)/release of multiple frictional engagement mechanisms included in the automatic transmission TM under the control of the AT-ECU 5.

The vehicle 1 includes a crank shaft rotation number sensor 201, an input shaft rotation number sensor 202, and an output shaft rotation number sensor 203. The crank shaft rotation number sensor 201 detects a rotation number Ne of the crank shaft 221 (the engine EG), and outputs the rotation number Ne to the AT-ECU 5 and the FI-ECU (fuel injection control device) 4. The input shaft rotation number sensor 202 detects a rotation number (input shaft rotation number of the automatic transmission TM) Ni of the input shaft 227, and outputs the rotation number Ni to the AT-ECU 5. The output shaft rotation number sensor 203 detects a rotation number (output shaft rotation number of the automatic transmission TM) No of the output shaft 228, and outputs the rotation number No to the AT-ECU 5. The AT-ECU 5 calculates the vehicle speed data from the rotation number data Ne, Ni, and No detected by each of the sensors 201 to 203. In addition, the vehicle 1 includes a throttle opening sensor 206. The throttle opening sensor 206 detects a throttle opening TH of the engine EG, and outputs the data of the throttle opening TH to the FI-ECU 4.

In addition, the AT-ECU 5 that controls the automatic transmission TM has a shift map (speed change characteristic) 55 which defines an area of the shift gear level that can be set by the automatic transmission TM, according to the vehicle speed detected by a vehicle speed sensor of the vehicle speed acquisition unit 28 and the accelerator opening detected by the accelerator opening sensor 71. The shift map 55 includes an upshift line and a downshift line set for each shift gear level, and multiple types of shift maps having different characteristics are prepared in advance. In the speed change control of the automatic transmission TM, the AT-ECU 5 performs control of switching the shift gear level of the automatic transmission TM according to a shift map selected from these multiple types of shift maps.

<Automated Driving Control>

In the vehicle 1, when the automated driving mode is selected by the operation of the changeover switch 80 by the driver, the automated driving control unit 110 performs the automated driving control of the vehicle 1. In the automated driving control, the automated driving control unit 110 grasps the current traveling state (actual traveling trajectory, traveling position, and the like) of the vehicle 1 based on the information acquired from the external situation acquisition unit 12, the route information acquisition unit 13, the traveling state acquisition unit 14, and the like, or the information recognized by the host vehicle position recognition unit 112 and the external environment recognition unit 114. The target traveling state set unit 118 sets, based on the action plan generated by the action plan generation unit 116, the target traveling state (the target trajectory and target position) which is a traveling state targeted by the vehicle 1. The deviation acquisition unit 42 acquires the deviation of the actual traveling state with respect to the target traveling state. When the deviation is acquired by the deviation acquisition unit 42, the traveling control unit 120 performs the traveling control so as to cause the traveling state of the vehicle 1 to match or approach the target traveling state.

The correction unit 44 corrects the target trajectory or the target position based on the traveling position acquired by the traveling position acquisition unit 26. In order that the vehicle 1 follows a new target trajectory or a target position, the traveling control unit 120 performs the acceleration/deceleration control of the vehicle 1 by the travel driving force output device 90 and the brake device 94 based on the vehicle speed or the like acquired by the vehicle speed acquisition unit 28.

In addition, the correction unit 44 corrects the target trajectory based on the traveling position acquired by the traveling position acquisition unit 26. In order that the vehicle 1 follows a new target trajectory, the traveling control unit 120 performs the steering control by the steering device 92 based on the steering angular speed acquired by the steering angle acquisition unit 32.

Here, the vehicle 1 has a braking function obtained by the brake device (mechanical braking mechanism) 94, and a braking function obtained by an engine brake (internal combustion engine braking mechanism) that uses the engine EG and the automatic transmission TM to generate the braking force.

4. Control Method

Hereinafter, a control method according to the first example of the disclosure is described in detail. The control method according to the example can be implemented in the above-described system. Although the acceleration/driving force control at the time of overtaking is described here, the disclosure is applicable not only in the case of overtaking but also in a situation where a sudden increase in the driving force is expected.

4.1) Overtaking Control

Figure 3:
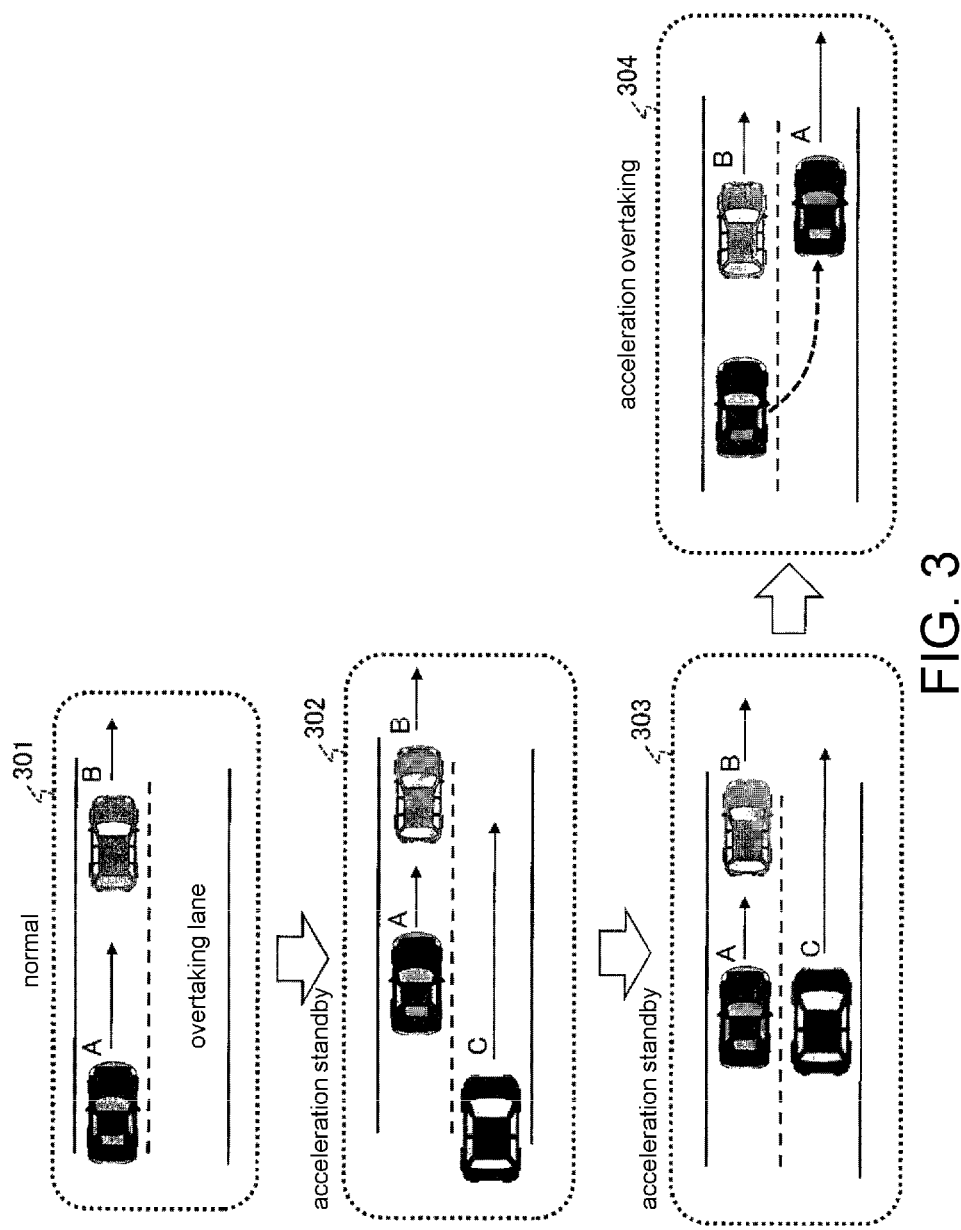
FIG. 3 is a schematic diagram showing a procedure of overtaking traveling for describing a control method for the automatic speed change vehicle shown in FIG. 2.

In FIG. 3, a vehicle A is the above vehicle 1 in which the control method according to the example is implemented, a vehicle B is a front vehicle to be overtaken, and a vehicle C is a rear vehicle approaching to overtake the vehicle A or a front vehicle traveling in an overtaking lane. These surrounding vehicles are recognized by the external environment recognition unit 114 as described above.

It is assumed that when a determination is made that the vehicle A according to the example overtakes the front vehicle B in a normal traveling 301, the external environment recognition unit 114 recognizes the approaching of the rear vehicle C. If the vehicle control device 100 determines that the rear vehicle C is approaching to overtake the host vehicle, the vehicle control device 100 suspends accelerating for overtaking until the rear vehicle C overtakes (acceleration standbys 302 and 303). Then, after the vehicle C overtakes, if the vehicle control device 100 determines that overtaking is possible, the vehicle control device 100 changes lanes to the overtaking lane, increases the required driving force and accelerates to execute the overtaking (acceleration overtaking 304). In addition, when the front vehicle C traveling in the overtaking lane is recognized, the overtaking may be executed when the front vehicle C returns to a passing lane.

According to the example, the downshift of the automatic transmission TM is executed more slowly than usual within a period of the acceleration standbys 302 and 303. Because the action plan is followed during the automated drive as described above, the speed change of the automatic transmission TM during the acceleration standby can be executed more slowly than a normal speed change. That is, in order to downshift, the vehicle control device 100 executes control for maintaining the driving force and the vehicle speed constant, gradually increasing the engine rotation number, and reducing the engine torque. By downshifting in this way, the speed change shock can be eliminated or alleviated, and the sense of discomfort of the occupant caused by sudden changes in engine noise and vibration can be suppressed.

The control method according to the example is carried out by the vehicle control device 100 described above. The control function can be realized by executing the program stored in the memory on the processor of the vehicle control device 100. Hereinafter, an example of the control method according to the example is described with reference to FIG. 4.

Figure 4:
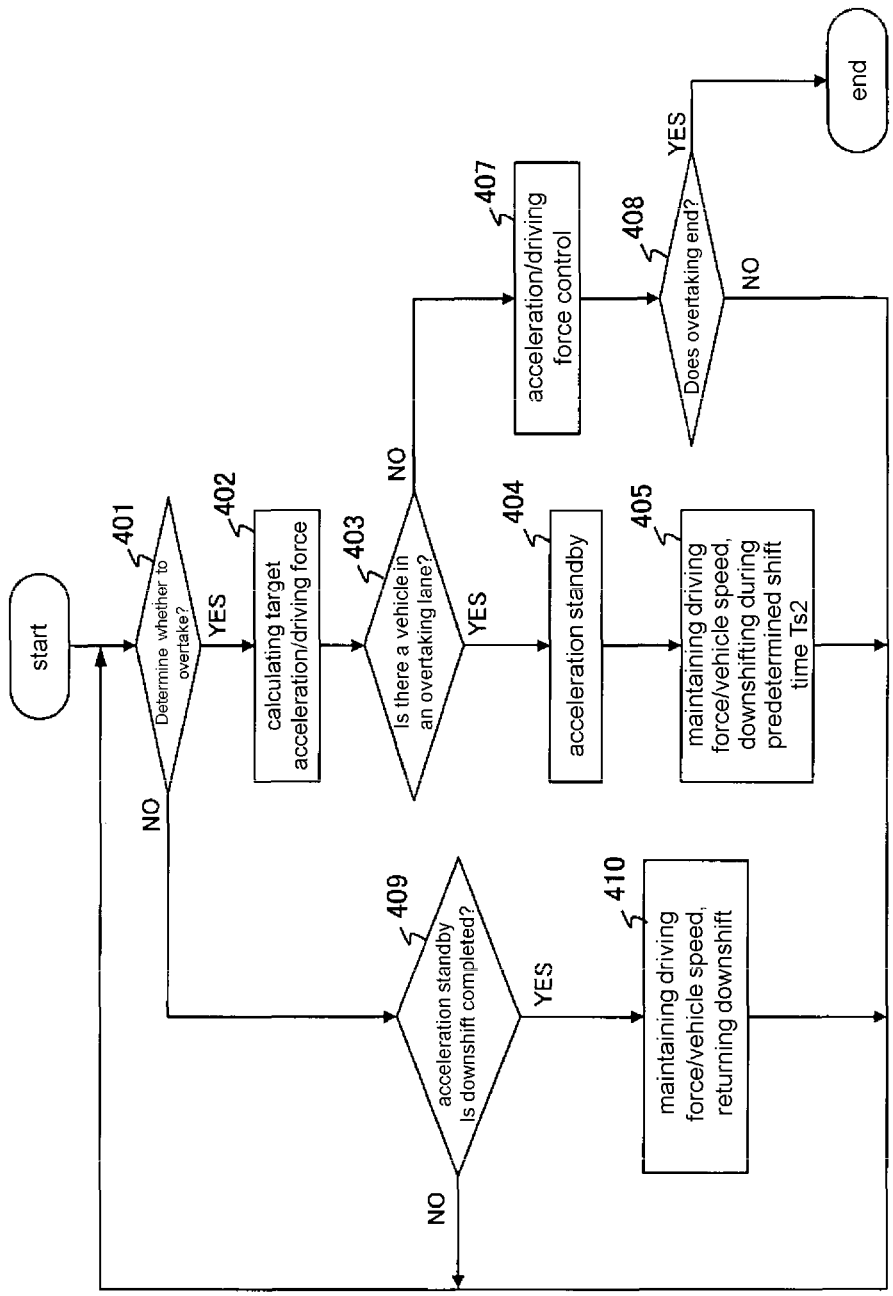
FIG. 4 is a flowchart showing a control during acceleration standby and acceleration execution by the control method for the automatic speed change vehicle shown in FIG. 2.

In FIG. 4, when the automated driving control unit 110 determines to overtake the front vehicle B (YES in operation 401), first, the automated driving control unit 110 calculates the target acceleration/driving force (required driving force) (operation 402), and then, recognizes the surrounding situation by the information from the external situation acquisition unit 12 and determines whether or not there is the rear vehicle C approaching the overtaking lane (operation 403). If there is the rear vehicle C (YES in operation 403), the automated driving control unit 110 waits for the execution of overtaking acceleration (operation 404).

In the acceleration standby, during a speed change time Ts2, the vehicle control device 100 raises the engine rotation number NE to a target value and lowers the engine torque so as to maintain the driving force of the engine EG and a vehicle speed V constant, and executes the downshift when the engine rotation number NE reaches a rotation number corresponding to the gear ratio after speed change (operation 405). The speed change time Ts2 is set longer than a normal speed change time Ts1 by loosely fastening a clutch in the automatic transmission TM, the lockup clutch of the torque converter TC, and the like. Moreover, the vehicle speed V of the vehicle A may be lowered during the acceleration standby period so as to not get too close to the front vehicle B or to allow the rear vehicle C to pass quickly.

If it is determined that there is no rear vehicle and the overtaking is possible to (NO in operation 403), the automated driving control unit 110 executes acceleration/driving force control with the target acceleration/driving force calculated in operation 402 according to the action plan (operation 407). The acceleration/driving force control (operation 407) is executed until the overtaking is completed (operation 408).

If it is determined that the overtaking is not executed (NO in operation 401), the vehicle control device 100 determines whether or not the downshift for automated drive has been completed (operation 409). If the downshift for automated drive has been completed (YES in operation 409), the vehicle control device 100 determines that the acceleration has been suspended, lowers the engine rotation number NE and raises the engine torque so as to maintain the driving force of the engine EG and the vehicle speed V constant, and executes the upshift when the engine rotation number NE reaches a rotation number corresponding to the gear ratio after speed change (operation 410). In addition, when the downshift for automated drive is not executed (NO in operation 409), operations 401 and 409 are repeated until a next overtaking determination (NO in operation 401, NO in operation 409).

Although the control at the time of overtaking has been described above as an example, the disclosure can be applied to any situation where a sudden increase in the driving force is predicted and there is time before the overtaking. Hereinafter, assuming a general case, the state change of the vehicle 1 when the acceleration is executed after the acceleration standby is described with reference to FIG. 5.

4.2) Acceleration Standby and Acceleration Execution (One-Level Downshift)

Figure 5:
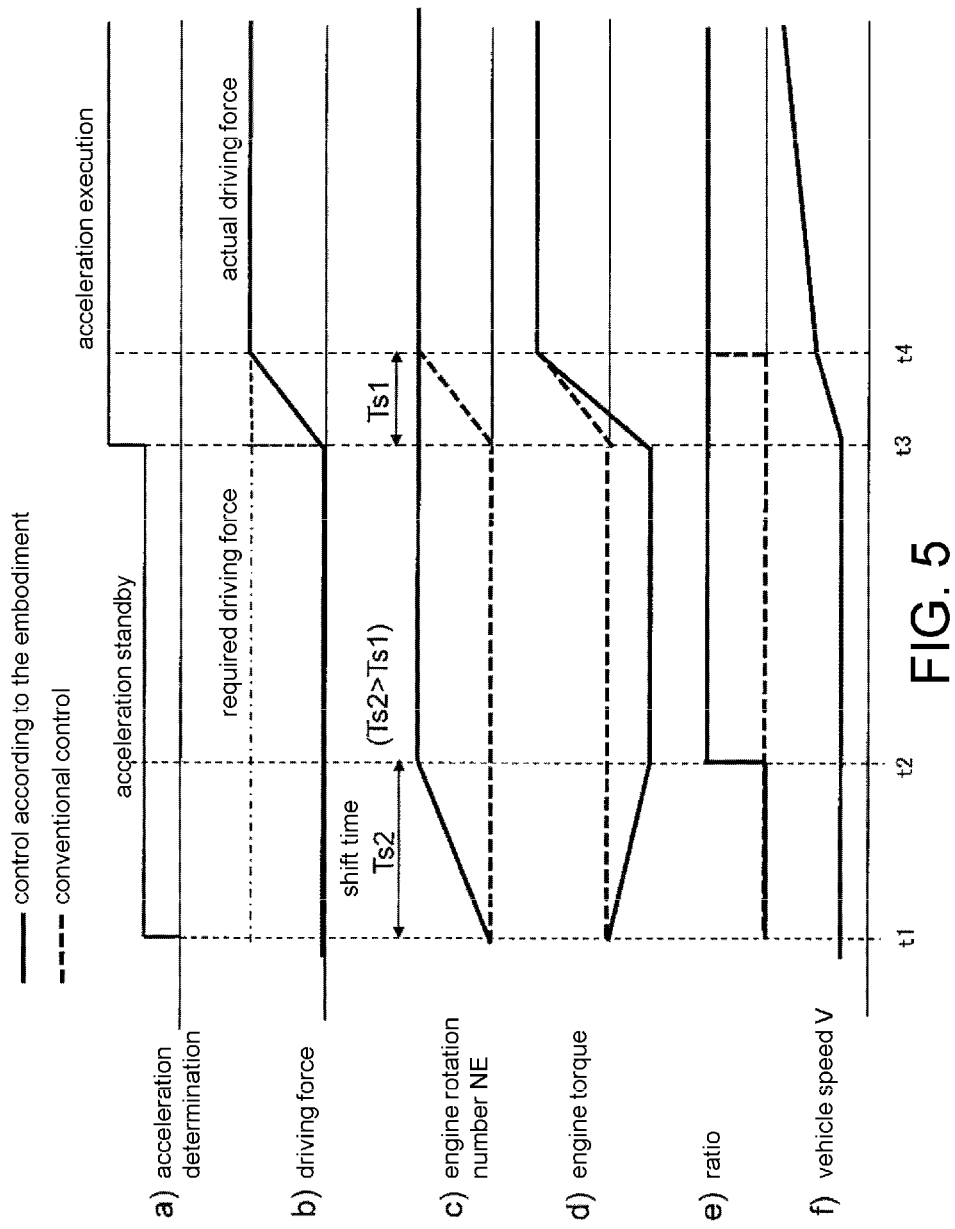
FIG. 5 is a waveform diagram illustrating a control state of one-level shift during acceleration standby and acceleration execution by the control method for the automatic speed change vehicle shown in FIG. 2.

As illustrated in FIG. 5, it is assumed that the acceleration standby is determined at a time point t1. The vehicle control device 100 calculates the required driving force that is necessary in advance, gradually increases the engine rotation number NE (c) and gradually decreases the engine torque (d) when the speed change time Ts2 elapses from the start of the acceleration standby. For example, the engine torque can be reduced by lowering the throttle opening. Because the engine torque decreases even if the engine rotation number NE increases, the vehicle control device 100 can maintain the vehicle speed V and the driving force constant (FIGS. 5(b) and (f)).

If the downshift is executed at a time point t2, the engine rotation number NE and the gear ratio of the automatic transmission TM are in a state where the actual acceleration can be executed. Thus, when the actual acceleration is executed at a time point t3, the vehicle control device 100 raises the engine torque to a target value (d) and raises the driving force required for acceleration to a required value (b). The engine torque can be increased by increasing the throttle opening. At this time, neither the gear ratio of the automatic transmission TM nor the engine rotation number NE changes.

Conventionally, the engine rotation number NE increases during the normal speed change time Ts1 between the time points t3 and t4 (a broken line in FIG. 5(c)), and the downshift is executed (e). Therefore, engine noise and vibration suddenly changes during the speed change time Ts1, causing a great sense of discomfort for the occupant. In contrast, according to the embodiment, the downshift is executed during the speed change time Ts2 longer than the normal speed change time Ts1. Because the speed change time Ts2 can be set within the time during the acceleration standby, the engine rotation number NE can be increased more slowly, and the conventional sense of discomfort can be greatly reduced.

4.3) Acceleration Standby and Acceleration Execution (Multilevel Downshift)

In the control illustrated in FIG. 5 described above, the one-level downshift is executed during the acceleration standby, but there is also a case in which a multilevel shift is required. Hereinafter, as an example, a case of downshifting from N level to (N−2) level by two levels is described.

Figure 6:
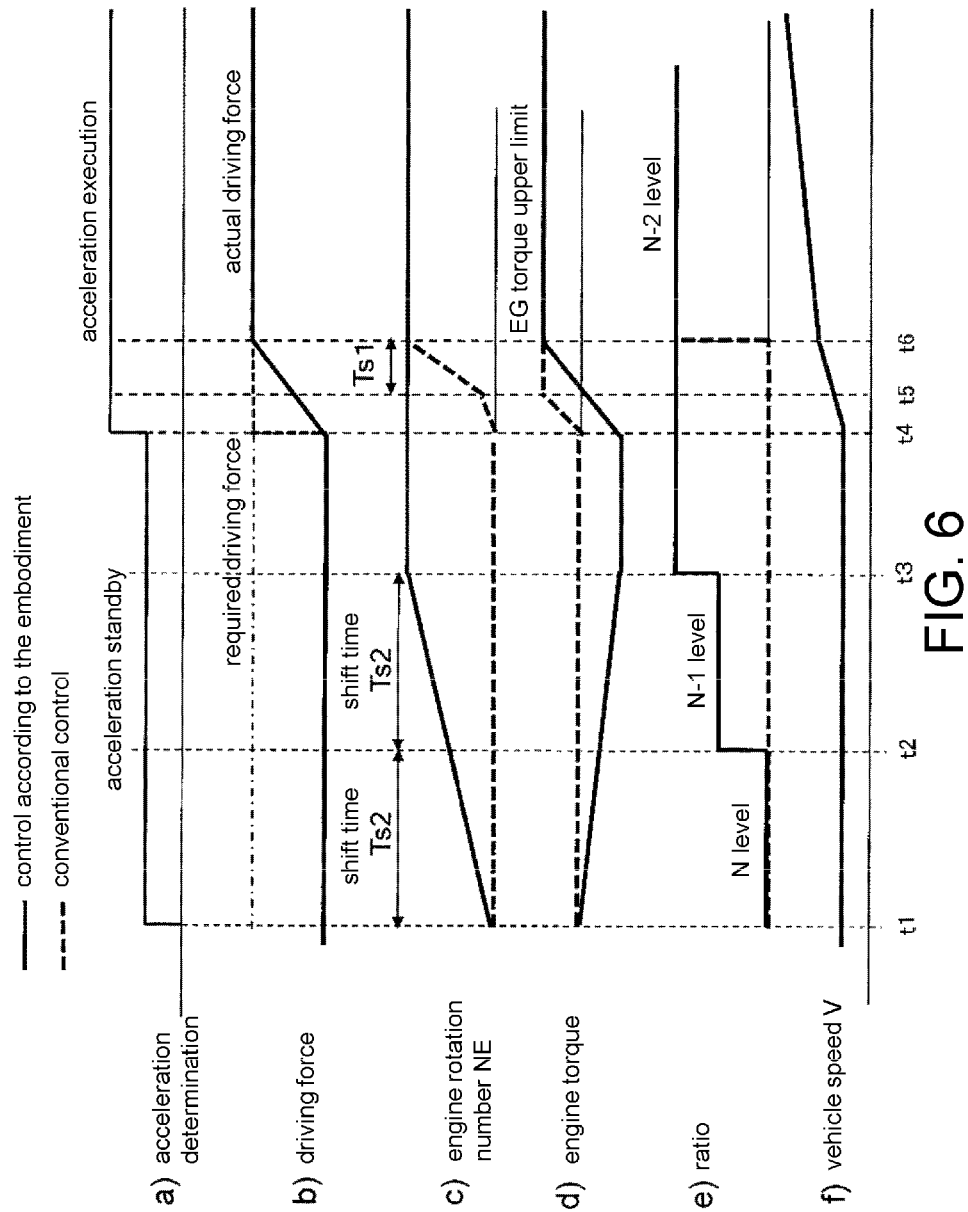
FIG. 6 is a waveform diagram illustrating a control state of multilevel shift during acceleration standby and acceleration execution by the control method for the automatic speed change vehicle shown in FIG. 2.

As illustrated in FIG. 6, it is assumed that the acceleration standby is determined at a time point t1. The vehicle control device 100 calculates the required driving force that is necessary in advance, downshifts from N level to N−1 level at a time point t2 when the speed change time Ts2 has elapsed from the start of the acceleration standby, and then downshifts from the N−1 level to N−2 level at a time point t3 when another speed change time Ts2 has elapsed. During the time from the time point t1 to the time point t3, the engine rotation number NE is gradually increased (c) and the engine torque is gradually decreased (d). In this way, the vehicle control device 100 can perform control so as to maintain the vehicle speed V and the driving force constant (FIGS. 5(b) and (f)).

Because of the downshift to the N−2 level at the time point t3, the engine rotation number NE and the gear ratio of the automatic transmission TM are in a state where the actual acceleration can be executed. Thus, when the actual acceleration is started at the time point t4, the vehicle control device 100 raises the engine torque to a target value (d) and raises the driving force required for acceleration to a required value (b). At this time, neither the gear ratio of the automatic transmission TM nor the engine rotation number NE changes.

In the example, because the two-level downshift is executed in the time twice the speed change time Ts2, the engine rotation number NE changes more slowly, and the conventional sense of discomfort is greatly reduced. Moreover, the downshift has two levels in the above example, but even when the downshift has three levels or more, if the downshift is completed at two levels at most during the acceleration standby, the number of the last downshift level can be reduced by the number of the levels, and the same effect can be obtained.

In addition, the output of the engine EG may decrease depending on environmental conditions. Conventionally, as shown by a broken line in FIG. 6(d), if the engine torque reaches an upper limit at a time point t5, the downshift is executed during the speed change time Ts1, and thus the engine rotation number NE is suddenly increased. This may give the occupant a sense of discomfort. In contrast, according to the example, because the downshift is executed during the acceleration standby, this sudden increase in the engine speed NE can be avoided.

In addition, conventionally, a shift busy state in which the downshift and upshift are frequently repeated may occur during high-speed driving that is frequently used in automated drive, but according to the example, a shift busy can be avoided in which the downshift is frequently repeated by executing the downshift of multilevel in advance over a certain period of time in anticipation of the acceleration execution for overtaking.

4.4) Downhill Control

The control method according to the example can be applied in a situation where a downshift is expected. For example, when it is recognized from the map information that there is a downhill ahead, by performing the gentle speed change described above before reaching the downhill, the conventional sense of discomfort can be greatly reduced. Hereinafter, description is made with reference to FIG. 7 and FIG. 8.

Figure 7:
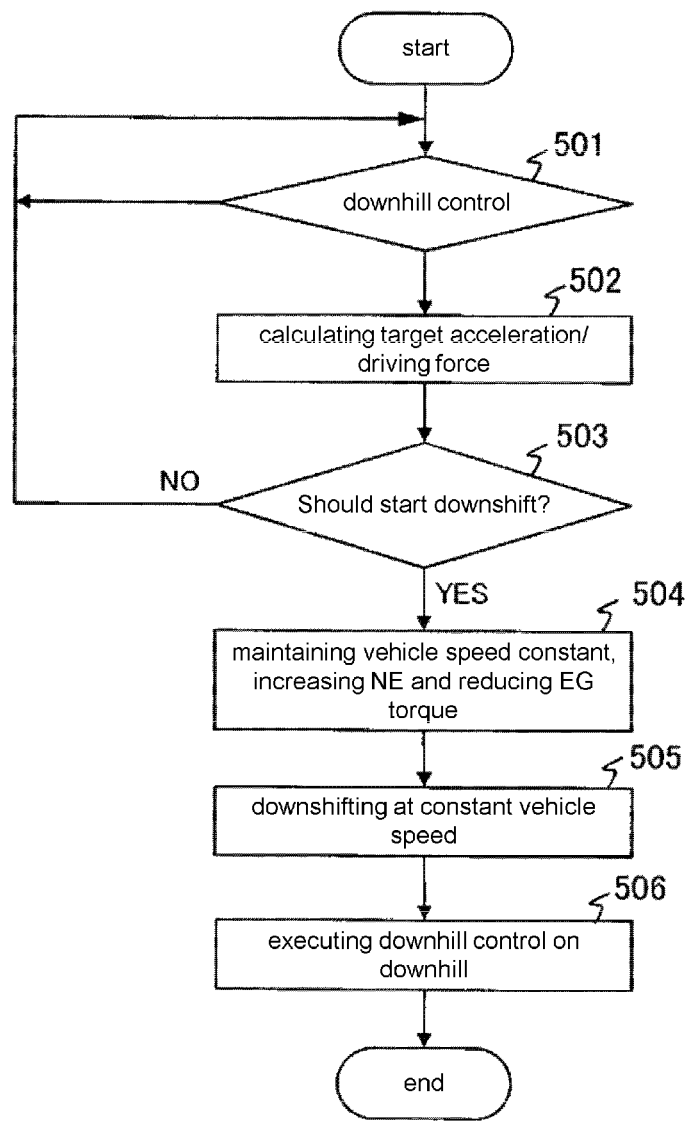
FIG. 7 is a flowchart showing a control during a downhill prediction and a downhill control by the control method for the automatic speed change vehicle shown in FIG. 2.

In FIG. 7, when the automated driving control unit 110 predicts that there is a downhill ahead ("YES" in operation 501), the automated driving control unit 110 calculates the target acceleration/driving force (the required driving force) (operation 502), and determines whether or not the downshift should be started in advance before reaching the downhill (operation 503). If the downshift should be started ("YES" in operation 503), the vehicle control device 100 raises the engine rotation number NE to a target value and lowers the engine torque so as to maintain the vehicle speed V constant during the speed change time Ts2 (operation 504), and executes the downshift when the engine rotation number NE reaches a rotation number corresponding to the gear ratio after speed change (operation 505). As described above, the speed change time Ts2 is set longer than the normal speed change time Ts1 by loosely fastening the clutch in the automatic transmission TM, the lockup clutch of the torque converter TC, and the like. Then, a downhill control is executed on the downhill (operation 506).

Figure 8:
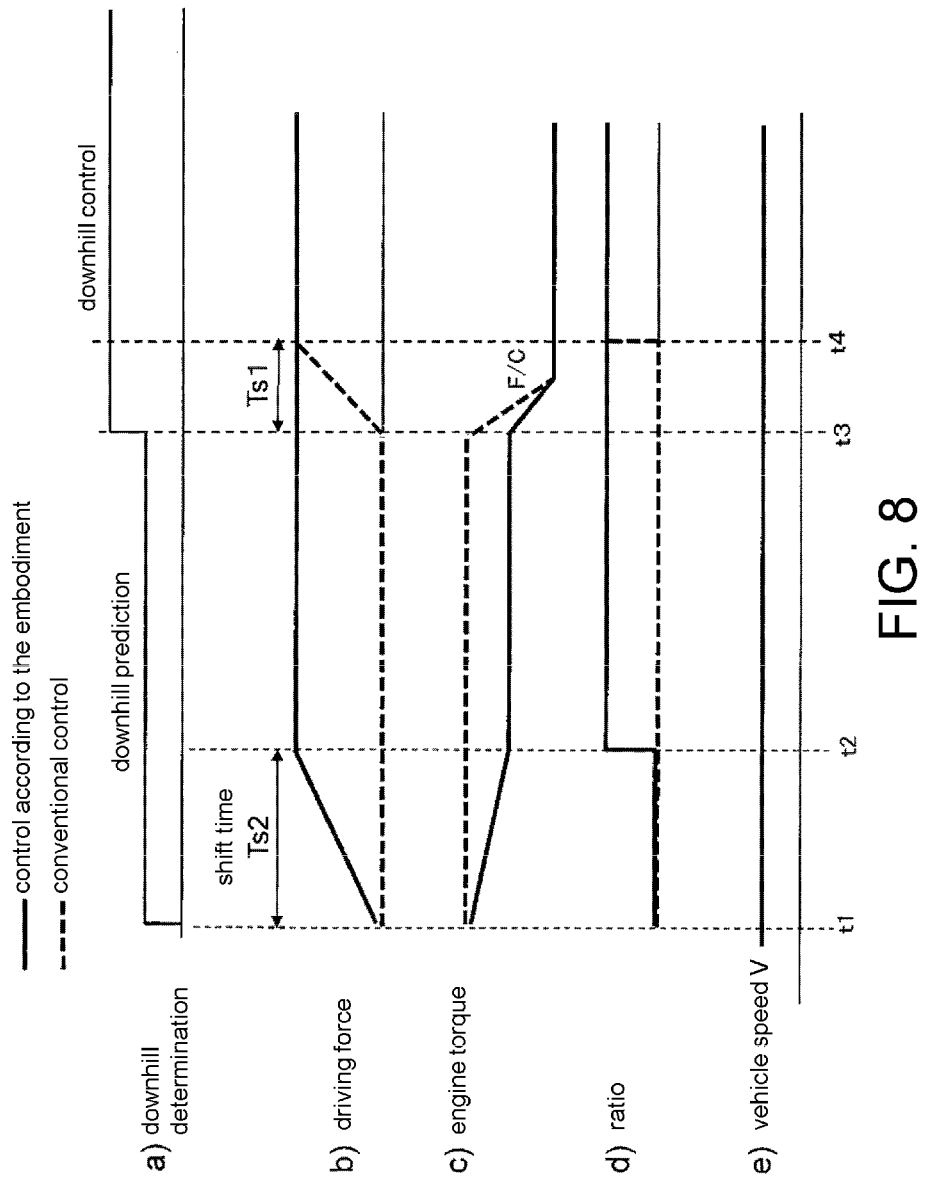
FIG. 8 is a waveform diagram illustrating a control state during the downhill prediction and the downhill control by the control method for the automatic speed change vehicle shown in FIG. 2.

As illustrated in FIG. 8, it is assumed that the downhill prediction is determined at a time point t1. The vehicle control device 100 calculates the required driving force that is necessary in advance, gradually increases the engine rotation number NE (b) and gradually decreases the engine torque (c) when the speed change time Ts2 elapses from the time point t1. For example, the engine torque can be reduced by lowering the throttle opening. Because the engine torque decreases even if the engine rotation number NE increases, the vehicle control device 100 can perform control so as to maintain the vehicle speed V constant.

If the downshift is executed at a time point t2, the engine rotation number NE and the gear ratio of the automatic transmission TM are in a state where the actual downhill control can be executed. Thus, if the actual downhill occurs at a time point t3, the vehicle control device 100 stops the supply of fuel to the engine EG according to the braking force determined based on the action plan, and executes a fuel cut (FC) control for activating the engine brake. At this time, neither the gear ratio of the automatic transmission TM nor the engine rotation number NE changes.

Conventionally, the engine rotation number NE increases during the normal speed change time Ts1 between the time points t3 and t4 (a broken line in FIG. 8(b)), and the downshift is executed (d). Therefore, engine noise and vibration suddenly changed during the speed change time Ts1, causing a great sense of discomfort for the occupant. In contrast, according to the embodiment, because the downshift is executed at the Ts2 which is longer than the normal speed change time Ts1, the engine rotation number NE changes more slowly, and the conventional sense of discomfort is greatly reduced.

5. Second Example

The disclosure can be applied not only to a vehicle equipped with a multilevel transmission but also a vehicle (a stepless speed change vehicle) equipped with a stepless transmission known as a continuously variable transmission (CVT). Hereinafter, a stepless speed change vehicle according to a second example of the disclosure is described.

The CVT is a winding type automatic transmission that winds a winding member such as a metal belt, a chain, or the like between pulleys arranged facing each other. Because the gear ratio can be adjusted steplessly, the CVT has an advantage of being able to effectively utilize power band of the engine as compared with a stepped transmission, but the CVT has also been pointed out for the deterioration of the drivability, which is called a rubber band feeling.

5.1) Driving System Having CVT

Figure 9:
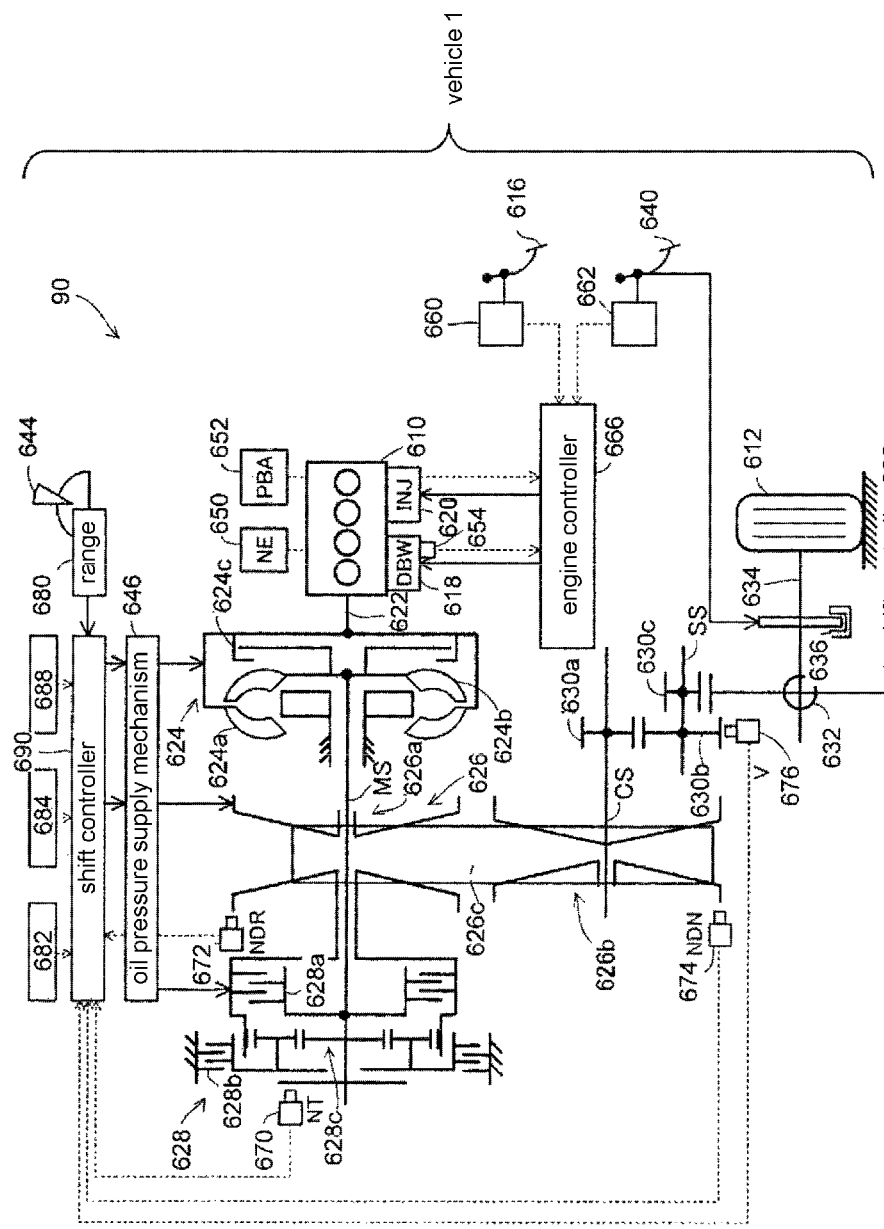
FIG. 9 is a block diagram schematically showing an example of the internal configuration of an automatic speed change vehicle (a stepless speed change vehicle) which uses the control device according to the first example of the disclosure.

In FIG. 9, the configuration of the travel driving force output device (driving device) 90 in the vehicle 1 according to the example is schematically shown. The vehicle 1 includes driving wheels 612, and an engine 610 which is an internal combustion engine is mounted on the vehicle 1.

A throttle valve (not shown) arranged in an intake system of the engine 610 is connected to a drive by wire (DBW) mechanism 618 including an actuator such as an electric motor or the like, and is opened and closed by the DBW mechanism 618.

Intake air metered by the throttle valve flows through an intake manifold, mixes with fuel injected from an injector 620 near an intake port of each cylinder to form an air-fuel mixture, and flows into a combustion chamber of this cylinder when an intake valve is opened. The air-fuel mixture is ignited by an ignition plug and burned in the combustion chamber, and after a piston is driven to rotate a crank shaft 622, the air-fuel mixture is discharged to the outside of the engine 610 as exhaust gas.

The rotation of the crank shaft 622 is input to a CVT 626 via a torque converter 624. That is, the rotation of an output shaft of the engine 610, which is determined by the throttle opening adjusted according to the operation of an accelerator pedal 616 by a driver by the DBW mechanism 618, is input to the CVT 626 via the torque converter 624.

The crank shaft 622 of the engine 610 is connected to a pump/impeller 624a of the torque converter 624. On the other hand, a turbine/runner 624b which is arranged facing the pump/impeller 624a and receives fluid (hydraulic oil) is connected to a main shaft (input shaft) MS. The torque converter 624 includes a lockup clutch 624c.

The CVT 626 includes an input pulley (drive (DR) pulley) 626a arranged on the main shaft MS, an output pulley (driven (DN) pulley) 626b arranged on a counter shaft (output shaft) CS which is parallel to the main shaft MS and connected to the driving wheel 612, and an endless transfer element such as a belt 626c made of metal hung between the input pulley 626a and the output pulley 626b.

The CVT 626 is connected to the engine 610 via a forward/reverse switching mechanism 628. The forward/reverse switching mechanism 628 includes a forward clutch 628a that enables the vehicle 1 to travel in the forward direction, a reverse brake clutch 628b that enables the vehicle 1 to travel in the reverse direction, and a planetary gear mechanism 628c arranged between the forward clutch 628a and the reverse brake clutch 628b.

The rotation of the counter shaft CS is transmitted from a secondary shaft (intermediate shaft) SS to the driving wheel 612 via a gear. That is, the rotation of the counter shaft CS is transmitted to the secondary shaft SS via gears 630a and 630b, and the rotation is transmitted from a differential mechanism (differential mechanism) 632 via a gear 630c to the left and right driving wheels (only the driving wheel on the right side is shown) 612 via a drive shaft (driving shaft) 634. Moreover, in this specification, the gears 630a, 630b, and 630c are collectively referred to as "output gear 630".

Disc brakes 636 are arranged near four wheels including the driving wheels (front wheels) 612 and driven wheels (rear wheels which are not shown), and a brake pedal 640 is arranged on a seat floor of the driver in the vehicle.

In the forward/reverse switching mechanism 628, the forward clutch 628a and the reverse brake clutch 628b are switched in a manner that the driver operates a range selector 644 arranged in the seat of the driver in the vehicle to select any one of ranges such as P, R, N and D. The range selection by the operation of the driver using the range selector 644 is transmitted to a manual valve of an oil pressure supply mechanism 646.

Although not shown, the oil pressure supply mechanism 646 includes an oil pressure pump that is driven by the engine 610 to pump up hydraulic oil from a reservoir and discharge the hydraulic oil into an oil passage, and various control valves and solenoid valves arranged in the oil passage. The oil pressure supply mechanism 646 supplies the oil pressure obtained by adjusting the pressure of the discharged hydraulic oil to the lockup clutch 624c of the torque converter 624 to engage and release the lockup clutch 624c.

In addition, the oil pressure supply mechanism 646 supplies the oil pressure to piston chambers of the pulleys 626a and 626b of the CVT 626. As a result, the pulley width between the pulleys 626a and 626b changes, the winding radius of the belt 626c changes, and the gear ratio (ratio) that transmits the rotation of the engine 610 to the driving wheel 612 is changed steplessly.

Furthermore, the oil pressure supply mechanism 646 supplies the oil pressure to a piston chamber of the forward clutch 628a or the reverse brake clutch 628b of the forward/reverse switching mechanism 628 via a manual valve that operates according to the position of the range selector 644 operated by the driver to enable the vehicle 1 to travel in the forward direction or the reverse direction.

A crank angle sensor 650 is arranged at an appropriate position near a camshaft (not shown) of the engine 610 or the like, and outputs a signal indicating the engine rotation number NE at each predetermined crank angle position of the piston. An absolute pressure sensor 652 is arranged at an appropriate position downstream of the throttle valve in the intake system, and outputs a signal proportional to the absolute pressure (engine load) PBA in an intake pipe.

A throttle opening sensor 654 is arranged in the actuator of the DBW mechanism 618, and outputs a signal proportional to the opening TH of the throttle valve through the amount of rotation of the actuator.

In addition, an accelerator opening sensor 660 is arranged near the accelerator pedal 616 and outputs a signal proportional to an accelerator opening AP corresponding to the depression amount (accelerator pedal operation amount) of the accelerator pedal 616 by the driver, and a brake switch 662 is arranged near the brake pedal 640 and outputs an on-signal in response to the operation of the driver of the brake pedal 640.

The output of the crank angle sensor 650 and the like described above are sent to an engine controller 666. The engine controller 666 is equipped with a microcomputer including a CPU, ROM, RAM, I/O, and the like, controls the operation of the DBW mechanism 618 based on the output of these sensors, and controls the fuel injection by the injector 620 and the ignition timing by the ignition plug or the like.

An NT sensor (rotation number sensor) 670 is arranged in the main shaft MS and outputs a pulse signal indicating the rotation number of the turbine/runner 624b, specifically the rotation number NT of the main shaft MS, and more specifically, the transmission input shaft rotation number (and the input shaft rotation number of the forward clutch 628a).

An NDR sensor (rotation number sensor) 672 is arranged at an appropriate position near the input pulley 626a of the CVT 626 and outputs a pulse signal corresponding to the rotation number NDR of the input pulley 626a, in other words, the output shaft rotation number of the forward clutch 628a.

An NDN sensor (rotation number sensor) 674 is arranged at an appropriate position near the output pulley 626b and outputs a pulse signal indicating the rotation number NDN of the output pulley 626b, specifically a rotation number of the counter shaft CS, and more specifically, the transmission output shaft rotation number.

In addition, a vehicle speed sensor (rotation number sensor) 676 is arranged near the gear 630b of the secondary shaft SS and outputs a pulse signal (specifically, a pulse signal indicating the vehicle speed V) indicating a rotation number and a rotation direction of the secondary shaft SS.

In addition, a range selector switch 680 is arranged near the range selector 644 described above and outputs a signal corresponding to a range such as R, N, D and the like selected by the driver.

An oil pressure sensor 682 is arranged in the oil passage of the oil pressure supply mechanism 646 and outputs a signal corresponding to the oil pressure supplied to the output pulley 626b. An oil temperature sensor 684 is arranged in the reservoir and outputs a signal corresponding to the oil temperature.

The output of the NT sensor 670 and the like described above are sent to a shift controller 690. The shift controller 690 is also equipped with a microcomputer including a CPU, ROM, RAM, I/O, and the like, and is configured to communicate freely with the engine controller 666.

The shift controller 690 controls the forward/reverse switching mechanism 628, the CVT 626, and the torque converter 624 by exciting/non-exciting the solenoid valve of the oil pressure supply mechanism 646 based on these detected values.

That is, the shift controller 690 calculates a friction coefficient between the output pulley 626b and the belt 626c according to a predetermined relational expression and based on a driving state detected and calculated based on various sensors (the input pulley rotation number NDR, the input torque, the vehicle speed V, and the like), an axial thrust that presses the input pulley 626a and the output pulley 626b in the axial direction of the main shaft MS and the counter shaft CS, and an inter-axis force indicating a force with which the main shaft MS and the counter shaft CS attract each other. Furthermore, by performing feedback control of the axial thrust applied to the output pulley 626b using the calculated value of the friction coefficient, the power transmission efficiency is improved and the abrasion of the belt 626c is suppressed.

6. Control Method

Hereinafter, a control method according to the second example of the disclosure is described in detail. The control method according to the example can be implemented in the CVT vehicle 1 described above. Although the acceleration/driving force control at the time of overtaking is described here, the disclosure is applicable not only in the case of overtaking but also in any situation where a sudden increase in the driving force is expected.

6.1) Overtaking Control

In the example, the overtaking scene of FIG. 3 described above is also considered. According to the example, the downshift of the CVT is executed more slowly than usual within a period of the acceleration standbys 302 and 303 in FIG. 3. As described above, because the action plan is followed during automated drive, the speed change of the CVT during the acceleration standby can be executed more slowly than a normal speed change. That is, the vehicle control device 100 executes control for gradually increasing the engine rotation number NE and gradually decreasing the engine torque when downshifting the CVT so as to maintain the driving force and the vehicle speed constant. By downshifting in this way, the sense of discomfort of the occupant caused by sudden changes in engine noise and vibration can be suppressed, and the rubber band feeling can be suppressed as described later.

The control method according to the example is carried out by the vehicle control device 100 described above. The control function can be realized by executing the program stored in the memory on the processor of the vehicle control device 100. Because the control method according to the example can be realized by the same control as the flow of FIG. 4 described above, the details of the flow are omitted.

6.2) Acceleration Standby and Acceleration Execution

Figure 10:
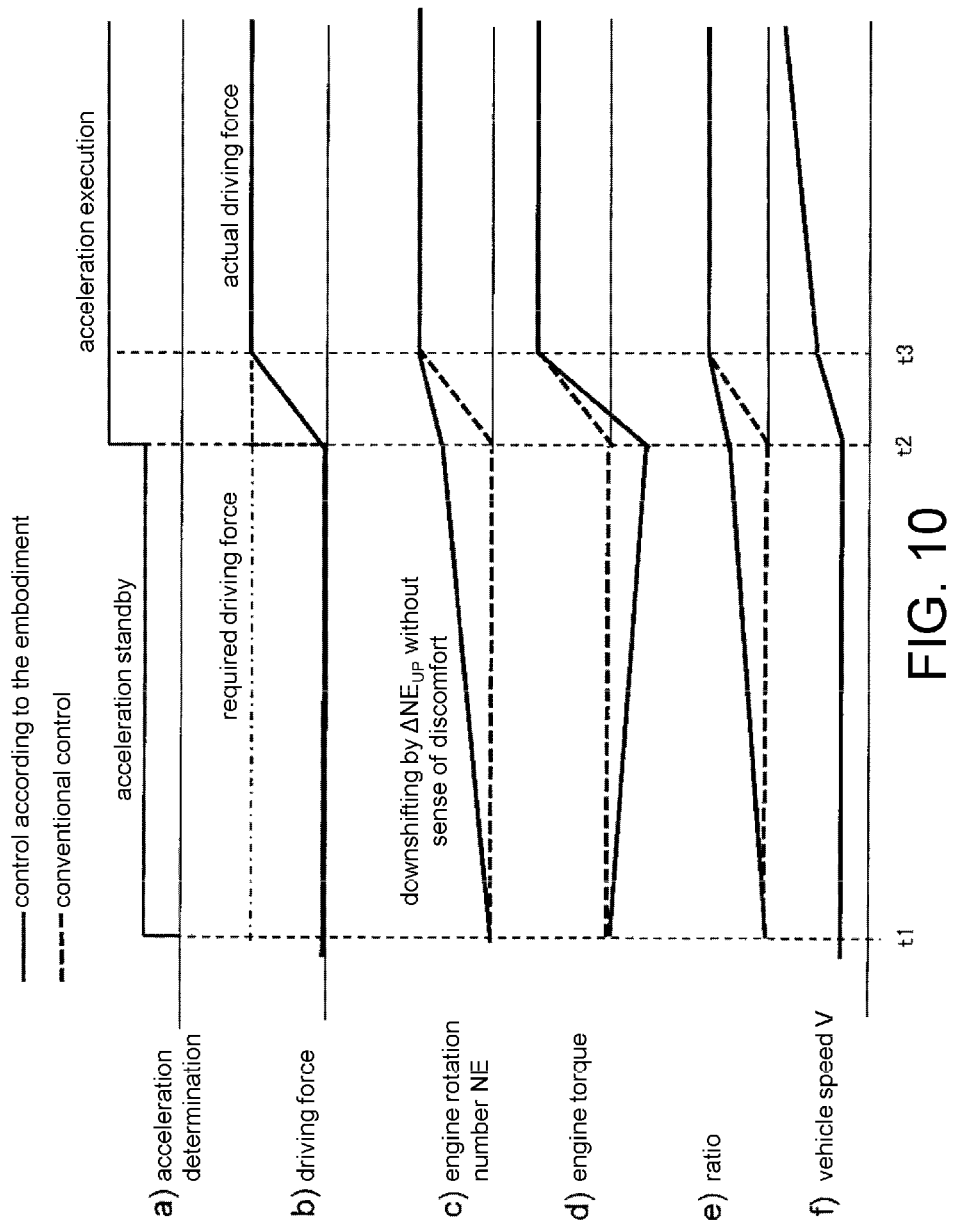
FIG. 10 is a waveform diagram showing a control state during acceleration standby and acceleration execution by a control method for the automatic speed change vehicle shown in FIG. 9.

As illustrated in FIG. 10, it is assumed that the acceleration standby is determined at a time point t1. The vehicle control device 100 calculates the required driving force that is necessary in advance, and gradually increases the engine rotation number NE (c) and gradually decreases the engine torque (d) when downshifting the CVT so as to maintain the driving force and the vehicle speed constant during the acceleration standby. For example, the engine torque can be reduced by lowering the throttle opening. In this way, the vehicle control device 100 can control the CVT, the engine rotation number NE, and the engine torque so as to maintain the vehicle speed V and the driving force constant.

When the actual acceleration is executed at a time point t2, the vehicle control device 100 raises the engine rotation number NE, the engine torque, and the ratio to a target value, and raises the driving force required for acceleration to a required value. The engine torque can be increased by increasing the throttle opening. Because the CVT ratio is downshifted and the engine rotation number NE is also rising at the time point t2, the rise widths of both the CVT ratio and the engine rotation number NE from the time point t2 till a time point t3 become small.

Conventionally, because of the downshift and the increase of the engine rotation number NE between the time points t2 and t3 (broken lines in FIGS. 10(c) and (e)), the engine noise and the vibration suddenly changes between the time points t2 and t3, causing a great sense of discomfort for the occupant. In contrast, according to the embodiment, because the downshift is gradually executed during the acceleration standby, the engine rotation number NE changes more slowly, and the conventional sense of discomfort is greatly reduced. In addition, because the CVT ratio is downshifted and the engine rotation number NE is also rising at the time point t2, quick acceleration is possible during acceleration execution.

6.3) Acceleration Suspension

Figure 11:
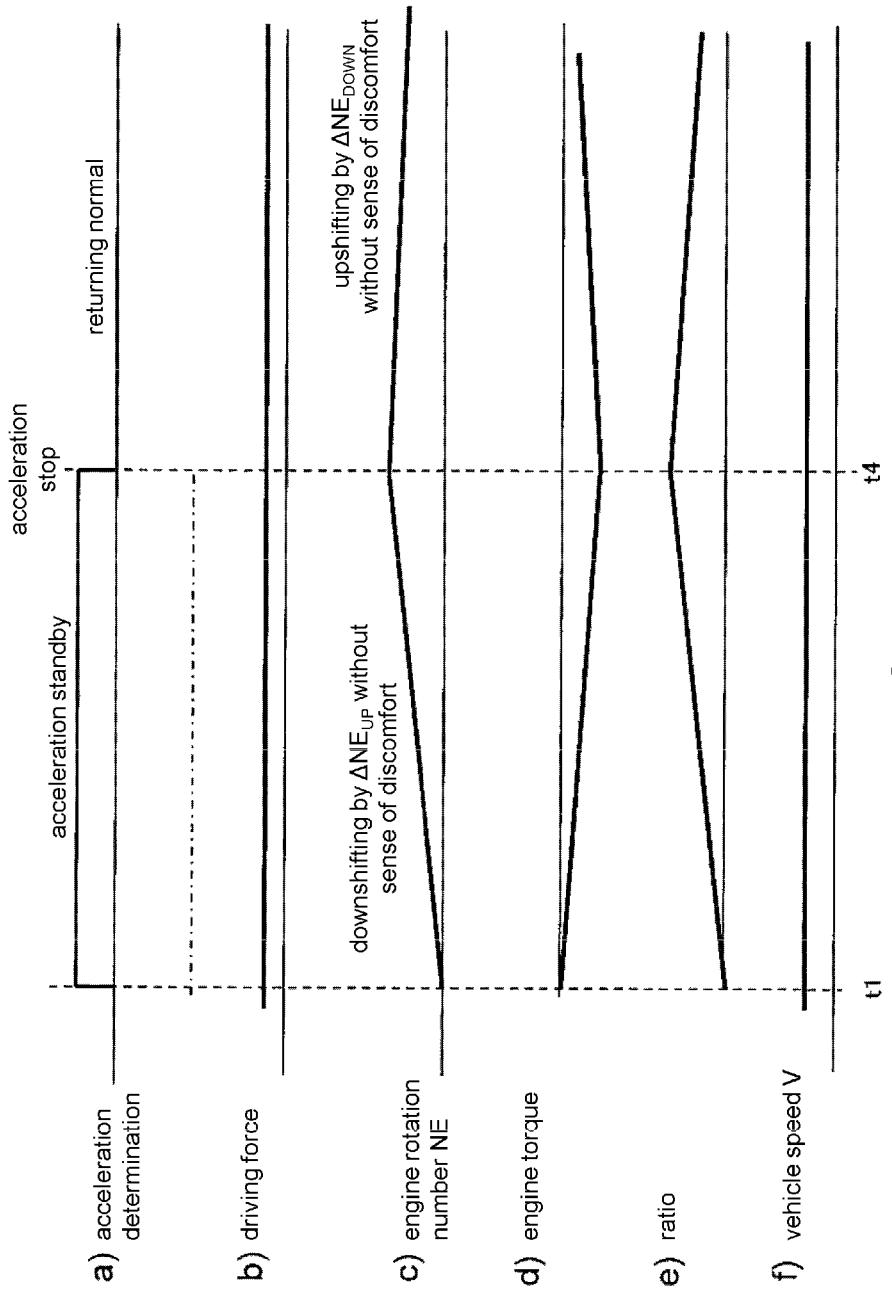
FIG. 11 is a waveform diagram illustrating a control state when acceleration is suspended by the control method for the automatic speed change vehicle shown in FIG. 9.

As illustrated in FIG. 11, it is assumed that the acceleration standby is determined at a time point t1, but the acceleration suspension is determined at a time point t4. In this case, because the CVT has been downshifted, the engine rotation number NE has been raised, and the engine torque has been lowered until the time point t4, the vehicle control device 100 performs control to gradually restore the CVT, the engine rotation number NE and the engine torque. According to the embodiment, in order to maintain the driving force and the vehicle speed constant, the upshift is executed in order that the engine rotation number NE is lowered by ANEDowN, which is smaller than ANEup when the engine rotation number NE is raised. By lowering the engine rotation number NE more slowly than when raising the engine rotation number NE, the sense of discomfort of the occupant can be eliminated.

6.4) Suppression of Rubber Band Feeling

Figure 12:
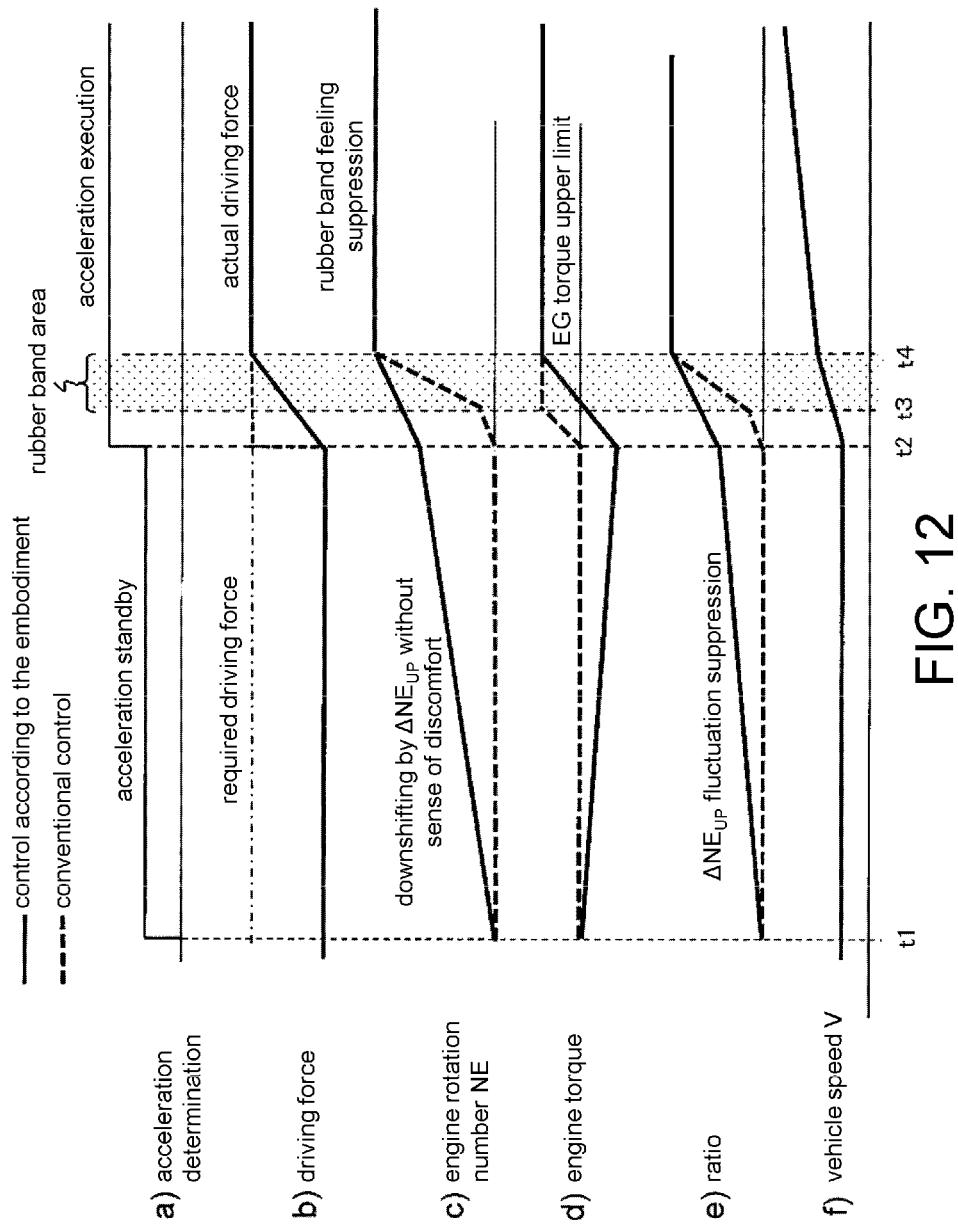
FIG. 12 is a waveform diagram showing a control state during acceleration standby and acceleration execution for describing a rubber band suppression effect by the control method for the automatic speed change vehicle shown in FIG. 9.

In a conventional control shown by broken lines in FIG. 12, the acceleration is executed at a time point t2, the engine rotation number NE and the engine torque are raised, and the downshift is executed. However, if the engine torque reaches the upper limit at a time point t3 as shown by a broken line in FIG. 12(d), the driving force is supplemented only by the ratio. Thus, the ratio is downshifted and the engine rotation number NE is raised to perform acceleration between the time points t3 and t4. The rise of the engine rotation number NE becomes larger than the rise of the vehicle speed V between the time points t3 and t4, and a feeling is generated that the vehicle speed does not increase as compared with the loudness of the engine sound, that is, a rubber band feeling.

In contrast, according to the example shown by a solid line in FIG. 12, because the downshift is executed and the engine rotation number NE is raised in an extent that there is no sense of discomfort during the acceleration standby, the rubber band feeling in which only the engine rotation number NE suddenly rises can be avoided.

6.5) Downhill Control

The control method according to the example can be applied in a situation where a downshift is expected. For example, when it is recognized from the map information that there is a downhill ahead, the conventional sense of discomfort can be greatly reduced by performing gentle speed change described above before reaching the downhill. In addition, because the flow of downhill control in the example is basically the same as that shown in FIG. 7, the description thereof is omitted, and the state of the downhill control is described with reference to FIG. 13.

Figure 13:
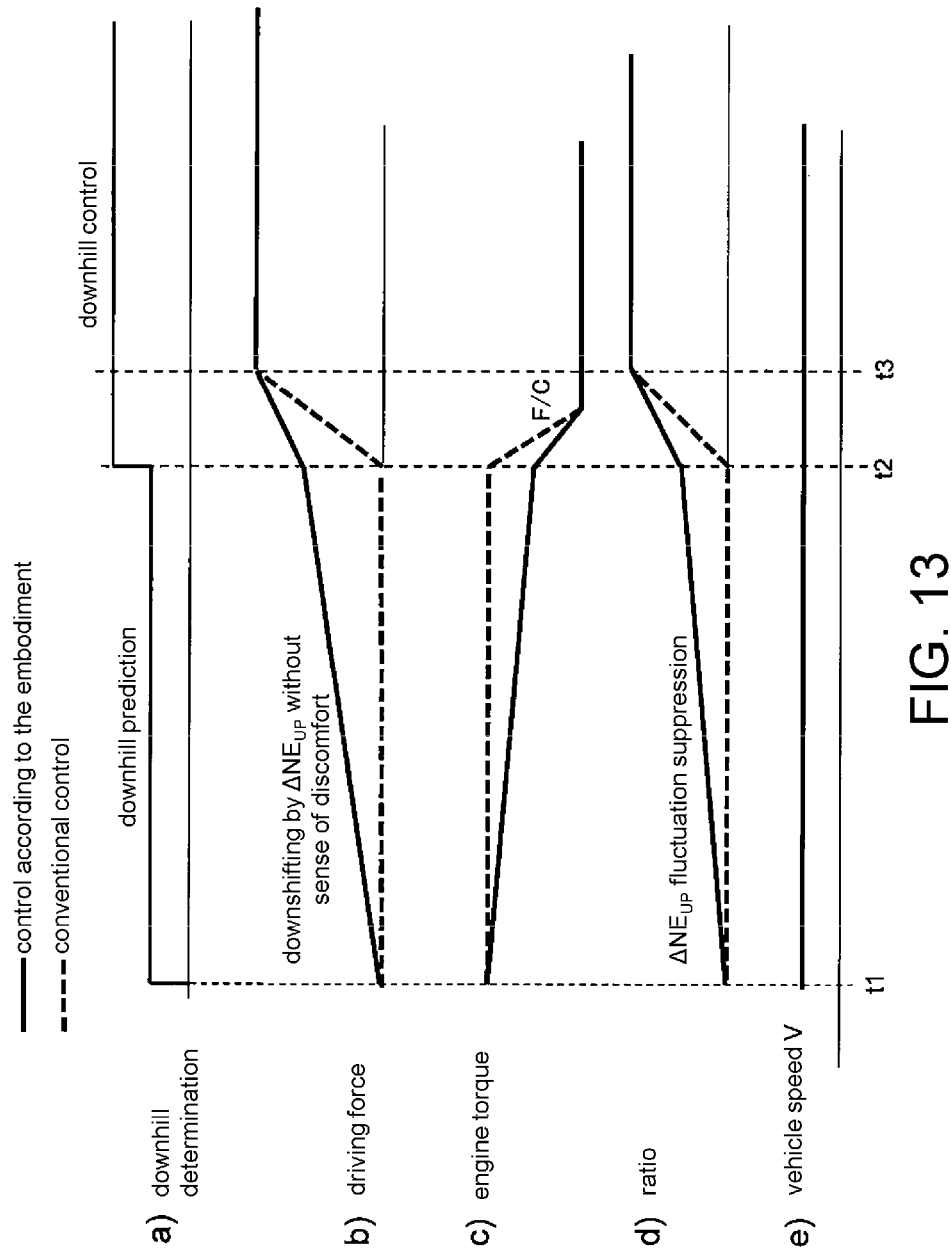
FIG. 13 is a waveform diagram illustrating a control state a downhill prediction and during a downhill control by the control method for the automatic speed change vehicle shown in FIG. 9.

As illustrated in FIG. 13, it is assumed that the downhill prediction is determined at a time point t1. The vehicle control device 100 calculates the required driving force that is necessary in advance, and gradually raises the engine rotation number NE (b) and gradually lowers the engine torque (c) by downshifting between time points t1 and t2. For example, the engine torque can be reduced by lowering the throttle opening. Because the engine torque decreases even if the engine rotation number NE increases, the vehicle control device 100 can perform control so as to maintain the vehicle speed V constant.

If the downhill control is started at the time point t2, the vehicle control device 100 stops the supply of fuel to the engine EG according to the braking force determined based on the action plan, and executes the fuel cut (FC) control that activates the engine brake. At this time, neither the gear ratio of the CVT nor the engine rotation number NE changes significantly.

Conventionally, the engine rotation number NE is raised (a broken line in FIG. 13(b)), and the downshift is executed (d) between the time points t2 and t3. Therefore, the engine noise and vibration suddenly changes, causing a great sense of discomfort for the occupant. In contrast, according to the embodiment, because the downshift is executed during the downhill prediction period, the engine rotation number NE changes more slowly, and the conventional sense of discomfort is greatly reduced.

7. Effect

As described above, according to the embodiments and the examples of the disclosure, when there is time before the required driving force of the automatic speed change vehicle reaches a change timing that is necessary during automated drive, the downshift is executed in which the vehicle speed is kept constant, the engine rotation number is gradually increased, and the engine torque is gradually decreases until the change timing, and thereby the vibration, the noise, and the speed change shock caused by the downshift when the required driving force changes actually can be reduced.

What is claimed is:

1. A control device for a vehicle which is equipped with an automatic transmission and capable of automated driving control for automatically controlling at least acceleration/deceleration of the vehicle, wherein
   when an increase in a required driving force is predicted during the execution of the automated driving control, a vehicle speed of the vehicle is maintained or decelerated until an increase timing of the required driving force;
   an engine rotation number is increased within a standby period until the increase timing of the required driving force; and
   a torque of the engine is decreased in response to the increase in the engine rotation number, and a shift gear level of the automatic transmission is shifted downward.

2. The control device for a vehicle according to claim 1, wherein the increase in the engine rotation number is executed in a period shorter than the standby period and longer than a normal speed change time.

3. The control device for a vehicle according to claim 1, wherein when the increase in the required driving force is suspended, the shift gear level of the automatic transmission is shifted upward to reduce the engine rotation number that has been increased up to that time.

4. The control device for a vehicle according to claim 3, wherein the upward shift of the shift gear level of the automatic transmission is performed in a manner that an amount of change of the decrease in the engine rotation number is smaller than that of the increase.

5. The control device for a vehicle according to claim 1, wherein the increase of the required driving force is necessary at the time of overtaking, and there is a possibility of collision with a vehicle in front or behind in the overtaking lane when the overtaking is executed, the overtaking control is waited for until the overtaking becomes possible.

6. A control method for a vehicle which is equipped with an automatic transmission and capable of automated driving control for automatically controlling at least acceleration/deceleration of the vehicle, wherein
   when an increase in a required driving force is predicted during the execution of the automated driving control, a vehicle speed of the vehicle is maintained or decelerated until an increase timing of the required driving force;
   an engine rotation number is increased within a standby period until the increase timing of the required driving force; and a torque of the engine is decreased in response to the increase in the engine rotation number, and a shift gear level of the automatic transmission is shifted downward.

7. The control method for a vehicle according to claim 6, wherein the increase in the engine rotation number is executed in a period shorter than the standby period and longer than a normal speed change time.

8. The control method for a vehicle according to claim 6, wherein when the increase of the required driving force is suspended, the shift gear level of the automatic transmission is shifted upward to reduce the engine rotation number that has been increased up to that time.

9. The control method for a vehicle according to claim 8, wherein the upward shift of the shift gear level of the automatic transmission is performed in a manner that an amount of change of the decrease in the engine rotation number is smaller than that of the increase.

10. The control method for a vehicle according to claim 6, wherein the increase of the required driving force is necessary at the time of overtaking, and there is a possibility of collision with a vehicle in front or behind in the overtaking lane when the overtaking is executed, the overtaking control is waited for until the overtaking becomes possible.

11. A storage medium storing a program, which causes a processor to function as a control device for a vehicle, wherein the vehicle is equipped with an automatic transmission and capable of automated driving control for automatically controlling at least acceleration/deceleration of the vehicle, and the program realizes, by the processor, the following function that
    when an increase in a required driving force is predicted during the execution of the automated driving control, a vehicle speed of the vehicle is maintained or decelerated until an increase timing of the required driving force;
    an engine rotation number is increased within a standby period until the increase timing of the required driving force; and
    a torque of the engine is decreased in response to the increase in the engine rotation number, and a shift gear level of the automatic transmission is shifted downward.

* * * * *